United States Patent
Wilson et al.

(10) Patent No.: US 9,434,216 B2
(45) Date of Patent: *Sep. 6, 2016

(54) TIRE INFLATION SYSTEM WITH DISCRETE DEFLATION CIRCUIT

(71) Applicant: HENDRICKSON USA, L.L.C., Itasca, IL (US)

(72) Inventors: Matt J. Wilson, Canal Fulton, OH (US); Jesse W. Cervantez, Navarre, OH (US); Santo Padula, Medina, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 100 days.

This patent is subject to a terminal disclaimer.

(21) Appl. No.: 14/611,348

(22) Filed: Feb. 2, 2015

(65) Prior Publication Data

US 2015/0144222 A1    May 28, 2015

Related U.S. Application Data

(63) Continuation-in-part of application No. 13/194,284, filed on Jul. 29, 2011, now Pat. No. 8,973,633.

(51) Int. Cl.
    *B60C 23/00* (2006.01)
(52) U.S. Cl.
    CPC .................... *B60C 23/003* (2013.01)
(58) Field of Classification Search
    CPC .................................................. B60C 23/003
    See application file for complete search history.

(56) References Cited

U.S. PATENT DOCUMENTS

| | | | |
|---|---|---|---|
| 4,678,017 A | 7/1987 | Schultz | |
| 4,754,792 A | 7/1988 | Braun et al. | |
| 4,860,579 A | 8/1989 | Beverly | |
| 4,883,105 A | 11/1989 | Schultz | |
| 4,924,926 A | 5/1990 | Schultz et al. | |
| 5,180,456 A | 1/1993 | Schultz et al. | |
| 5,249,609 A | 10/1993 | Walker et al. | |
| 5,263,524 A | 11/1993 | Boardman | |
| 5,409,045 A | 4/1995 | Walker et al. | |
| 5,516,379 A * | 5/1996 | Schultz | B60C 23/003 141/38 |
| 5,524,481 A | 6/1996 | Claussen et al. | |
| 5,674,332 A | 10/1997 | Battocchio | |
| 6,098,682 A | 8/2000 | Kis | |
| 6,561,017 B1 | 5/2003 | Claussen et al. | |
| 6,894,607 B1 * | 5/2005 | Claussen | B60C 23/003 137/225 |
| 7,273,082 B2 | 9/2007 | White et al. | |
| 7,437,920 B2 | 10/2008 | Beverly et al. | |

(Continued)

*Primary Examiner* — Kip T Kotter
(74) *Attorney, Agent, or Firm* — Dureska & Moore, LLC; David P. Dureska; Greg Strugalski

(57) ABSTRACT

A vehicle tire inflation system includes an air supply source in fluid communication with multiple tires of the vehicle. A pneumatic conduit extends between and is in fluid communication with the air supply source and the tires. Means are fluidly connected to the pneumatic conduit for enabling selective inflation and deflation of the tires. The means include a first pneumatic circuit for inflation of the tires, and a second pneumatic circuit for deflation of the tires. The second pneumatic circuit is discrete from the first pneumatic circuit and is common to more than one of the tires. The means provides controlled deflation of the tires in the second pneumatic circuit based upon a predetermined condition, preventing deflation of the tires until the vehicle is parked, or limiting the deflation of the tires, which in turn enables the tire inflation system to accommodate a desirable increased pressure in the tires.

14 Claims, 15 Drawing Sheets

(56) References Cited

U.S. PATENT DOCUMENTS

| | | |
|---|---|---|
| 7,530,379 B1 | 5/2009 | Becker et al. |
| 7,669,465 B2 | 3/2010 | Becker |
| 8,136,561 B2 | 3/2012 | Sandoni et al. |
| 8,245,746 B2 * | 8/2012 | Stanczak ................. F04B 41/02 152/415 |
| 8,505,600 B2 | 8/2013 | Padula et al. |
| 8,973,633 B2 * | 3/2015 | Wilson ................. B60C 23/003 152/415 |
| 2006/0180256 A1 * | 8/2006 | Mittal ................... B60C 23/004 152/416 |
| 2015/0136270 A1 * | 5/2015 | Keane ................... B60C 23/003 141/4 |

* cited by examiner

TIRE INFLATION SYSTEM WITH DISCRETE DEFLATION CIRCUIT

CROSS-REFERENCE TO RELATED APPLICATIONS

This application is a continuation-in-part of U.S. patent application Ser. No. 13/194,284, filed on Jul. 29, 2011, which claims the benefit of U.S. Provisional Patent Application Ser. No. 61/369,159, filed on Jul. 30, 2010.

BACKGROUND OF THE INVENTION

1. Technical Field

The invention relates to the art of tire inflation systems. More particularly, the invention relates to tire inflation systems for heavy-duty vehicles such as trucks and tractor-trailers or semi-trailers, which can operate as the vehicles are moving. Still more particularly, the invention is directed to a tire inflation system which includes a tire deflation circuit that is discrete or separate from an inflation circuit, thereby enabling control of tire deflation based on specific predetermined conditions.

2. Background Art

Heavy-duty vehicles typically include trucks and tractor-trailers or semi-trailers. Tractor-trailers and semi-trailers, which shall collectively be referred to as tractor-trailers for the purpose of convenience, include at least one trailer, and sometimes two or three trailers, all of which are pulled by a single tractor. All heavy-duty vehicles that are trucks or tractor-trailers include multiple tires, each of which is inflated with a fluid or gas, such as air, to an optimum or recommended pressure. This optimum or recommended tire pressure typically is referred to in the art as the target inflation pressure or the target pressure.

However, it is well known that air may leak from a tire, usually in a gradual manner, but sometimes rapidly if there is a problem with the tire, such as a defect or a puncture caused by a road hazard. As a result, it is necessary to regularly check the air pressure in each tire to ensure that the tires are not significantly below the target pressure and thus under-inflated. Should an air check show that a tire is under-inflated, it is desirable to enable air to flow into the tire to return it to the target pressure. Likewise, it is well known that the air pressure in a tire may increase due to increases in ambient air temperature, so that it is necessary to regularly check the air pressure in each tire to ensure that the tires are not greatly above the target pressure and thus over-inflated. Should an air check show that a tire is over-inflated, it is desirable to enable air to flow out of the tire to return it to the target pressure.

The large number of tires on any given heavy-duty vehicle setup makes it difficult to manually check and maintain the target pressure for each and every tire. This difficulty is compounded by the fact that trailers of tractor-trailers or trucks in a fleet may be located at a site for an extended period of time, during which the tire pressure might not be checked. Any one of these trailers or trucks might be placed into service at a moment's notice, leading to the possibility of operation with under-inflated or over-inflated tires. Such operation may increase the chance of less-than-optimum performance and/or reduced life of a tire in service as compared to operation with tires at the target pressure, or within an optimum range of the target pressure.

Moreover, should a tire encounter a condition as the vehicle travels over-the-road that causes the tire to become under-inflated, such as developing a leak from striking a road hazard, or over-inflated, such as increasing pressure from an increased ambient air temperature, the life and/or performance of the tire may be significantly reduced if the under-inflation or over-inflation continues unabated as the vehicle travels. The potential for significantly reduced tire life typically increases in vehicles such as trucks or tractor-trailers that travel for long distances and/or extended periods of time.

Such a need to maintain the target pressure in each tire, and the inconvenience to the vehicle operator to manually check and maintain a proper tire pressure that is at or near the target pressure, led to the development of prior art tire inflation systems. In these prior art systems, an operator selects a target inflation pressure for the vehicle tires. The system then monitors the pressure in each tire and attempts to maintain the air pressure in each tire at or near the target pressure by inflating the tire when the monitored pressure drops below the target pressure. These prior art tire inflation systems inflate the tires by providing air from the air supply of the vehicle to the tires by using a variety of different components, arrangements, and/or methods. In prior art systems that are also capable of deflation, the system deflates the tire when the monitored pressure rises above the target pressure by venting air from the tires to atmosphere.

While being satisfactory for their intended functions, tire inflation systems of the prior art may experience disadvantages in certain situations. More particularly, many prior art tire inflation systems are not capable of deflation. As a result, when the air pressure in a tire increases to a level that is greatly above the target pressure due to increases in ambient air temperature, these systems are not able to reduce the pressure in the tires. As a result, such prior art tire inflation systems may allow the tires to operate in a significantly over-inflated condition, which undesirably decreases performance of the tires and in turn decreases the life of the tires.

In addition, in those prior art tire inflation systems having a deflation capability, the systems generally inflate and deflate the vehicle tires through the same components, circuit or path of pneumatic conduit, valves and the like that extend from the vehicle air supply to the tires, which is referred to herein as a circuit. Use of the same circuit for inflation and deflation functions has been achieved in the prior art by employing electronically-controlled systems that include electronically-actuated solenoid valves. With a solenoid valve, when it is desired to inflate the tires, an electronic controller actuates the valve to move the valve to a position that enables air to flow from the air reservoir to the vehicle tires. When it is desired to deflate the tires, the electronic controller actuates the valve to move the valve to a position that exhausts air from the tires to atmosphere. Such prior art deflation-capable tire inflation systems have certain disadvantages.

First, prior art tire inflation systems only maintain the inflation pressure in the tires at the target pressure, and lack the ability to accommodate an increased tire pressure based on operating conditions. More particularly, the desired target inflation pressure typically is selected by the vehicle operator based on what is known in the art as a cold inflation pressure or cold pressure, which is the inflation pressure of the tires when the vehicle remains parked. In many cases, the tire manufacturer recommends a target pressure that is at a cold pressure setting for a specific axle load.

However, as the vehicle operates and travels over-the-road, the energy and forces associated with the travel cause the temperature of each vehicle tire to increase. When the temperature of the tire increases, the air inside the tire expands. Because the volume of the tire is limited, the expansion of air causes the air pressure inside the tire to increase above the cold inflation pressure. This increased air pressure is typically referred to as the operating pressure of the tires. By way of example, the operating pressure may be about fifteen (15) pounds per square inch (psi) greater than the cold pressure of each tire in a typical heavy-duty vehicle dual-wheel configuration. In fact, the National Highway Traffic Safety Administration (NHTSA) recommends adding about 15 psi to a cold pressure setting when checking pressure while the tires are at their operating temperature. The increase to the operating pressure is desirable, as tire manufacturers typically rely on the increase to compensate for lower side wall stiffness of the tire as its temperature increases during over-the-road travel, and thus often design heavy-duty vehicle tires to provide optimum performance at the operating pressure.

Because the vehicle operator typically selects a target inflation pressure for the tires which is at the cold inflation pressure, prior art tire inflation systems inflate or deflate the tires as needed to arrive at this cold target pressure. However, as described above, as the vehicle operates, the air pressure in the tires increases from the cold pressure to the higher operating pressure. Because prior art tire inflation systems only maintain the inflation pressure in the tires at the target pressure, as the air pressure in the tires increases during vehicle operation, the systems deflate the tires down from the optimum operating pressure to the lower cold target pressure. Due to this lack of ability to accommodate an increased tire pressure based on operating conditions, prior art tire inflation systems often maintain the inflation pressure of the tires at a level that is below the optimum operating pressure, which decreases tire performance, and thus vehicle performance.

In the event that the vehicle operator attempts to prevent a prior art inflation system from deflating the tires down from the optimum operating pressure to the lower cold target pressure by selecting a target inflation pressure which is at the higher operating pressure, undesirable demands may be placed on the system. More particularly, because the operating pressure is higher than the cold pressure, the operating pressure may approach or be at a pressure level that is not available in the vehicle air supply, or which would require the vehicle air supply to be maintained at an undesirably high level. The requirement of maintaining such a pressure level in the vehicle air supply places undesirable demands on the tire inflation system, which in turn reduces the performance and/or the life of the system. As a result, it is not practical to attempt to prevent prior art systems from deflating the tires down from the optimum operating pressure to the lower cold target pressure by selecting a target inflation pressure that is at the operating pressure.

A second disadvantage of prior art tire inflation systems is that most systems which are capable of both inflation and deflation are electronically controlled, which is undesirably expensive, complex, and potentially undependable. For example, electronically-controlled systems typically involve electronically-operated solenoid valves, electronic controllers, and other electronic components, which are expensive and are often complex to install and configure. In addition, these electrical components require the use of the electrical system of the vehicle, which may be unreliable or even non-functional at times, and in turn renders the operation of the tire inflation system unreliable and potentially non-functional.

A third disadvantage of prior art tire inflation systems is that the electronic systems are not constant-pressure systems. More particularly, when the system is not performing inflation, the pneumatic conduit of the system is exhausted to atmosphere and thus does not actively monitor tire pressure. In such a system, without air pressure in the pneumatic conduit, electronic controls are employed to periodically check tire pressure, and to in turn trigger or commence inflation. Because such prior art systems are capable of only providing a periodic check of tire pressure, any inflation to bring the tires to the target pressure only takes place following the periodic check. This lack of ability of prior art systems to continuously monitor tire pressure and dynamically respond to pressure changes undesirably reduces the ability of the system to actively or quickly respond to reduced tire pressure conditions, such as in the case of an air leak. Moreover, as mentioned above, the electronic controls that are employed by prior art tire inflation systems to determine when it is necessary to trigger or commence inflation are expensive, complex, and require power from the electrical system of the vehicle, which may be unreliable.

A fourth disadvantage of prior art tire inflation systems occurs in certain pneumatically-controlled systems which are constant-pressure systems, that is, systems that maintain air pressure at all times in a pneumatic conduit extending between the vehicle air reservoir and the tires. Some of these constant-pressure systems include a wheel valve that is capable of deflation, which keeps the inflation path from the air reservoir to the tires open. As is known to those skilled in the art, when a vehicle is parked for an extended period of time, the pneumatic pressure in the air reservoir may drop or bleed down due to small air leaks that are typical in any pneumatic system. Because prior art constant-pressure systems that include a wheel valve which is capable of deflation keep the inflation path from the air reservoir to the tires open, when the pneumatic pressure in the air reservoir drops, the pneumatic pressure in the tires also drops. This pressure drop may be up to 25 psi or more, at which point the wheel valve typically closes to eliminate an even greater pressure drop.

However, when the vehicle is started up to prepare for over-the-road travel, the tire inflation system must re-inflate each tire up to or near the target pressure, which may thus involve adding about 25 psi to each one of eight or more tires. This re-inflation process typically takes a great deal of time and places repeated demands on the tire inflation system, which may reduce the life of the system. In addition, the vehicle operator may not wait for the tires to be re-inflated to the target pressure before operating the vehicle, which in turn causes the tires to be operated in an under-inflated condition until the target pressure is reached. Such operation reduces the life of the tires. As a result, it is desirable for a constant-pressure tire inflation system to optionally include a feature that would isolate the tires from the air reservoir and other components of the system when the vehicle is parked, thereby minimizing pressure loss from the tires and in turn minimizing the subsequent time and demand on the system that is required to provide significant re-inflation of the tires.

A fifth disadvantage of prior art tire inflation systems occurs in certain pneumatically-controlled, constant-pressure systems that do not include a wheel valve that is capable of deflation. More particularly, without a wheel valve that is capable of deflation, such prior art systems cannot respond to excessive increased tire pressure from an increased ambient air temperature, as described above for prior art systems that are not capable of deflation. As a result, such prior art tire inflation systems may allow the tires to operate in a significantly over-inflated condition, which undesirably decreases performance of the tires and in turn decreases the life of the tires.

As a result, there is a need in the art for a tire inflation system that overcomes the disadvantages of the prior art by providing control of the conditions under which deflation occurs, by providing a system that has the ability to accommodate an increased tire pressure due to operating conditions, does not employ electronic components and thereby is more economical, simpler, more dependable and more efficient than tire inflation systems of the prior art, and which is a constant-pressure system that is capable of deflation and optionally includes a feature that enables isolation of the tires from the air reservoir and other components of the system when the vehicle is parked to minimize pressure loss. The tire inflation system with discrete deflation circuit of the present invention satisfies this need, as will be described in detail below.

BRIEF SUMMARY OF THE INVENTION

An objective of the present invention is to provide a tire inflation system that includes control of the conditions under which deflation through the system occurs.

Another objective of the present invention is to provide a tire inflation system that has the ability to accommodate an increased tire pressure, which is due to operating conditions.

Yet another objective of the present invention is to provide a tire inflation system that does not employ electronic components, and thus is more economical, simpler, more dependable and more efficient than tire inflation systems of the prior art.

Still another objective of the present invention is to provide a tire inflation system that is a constant-pressure system which is capable of deflation.

Yet another objective of the present invention is to provide a tire inflation system that optionally includes a feature which enables isolation of the tires from the air reservoir and other components of the system when the vehicle is parked in order to minimize pressure loss.

These objectives and others are obtained by the tire inflation system with discrete deflation circuit of the present invention. By way of example, the vehicle tire inflation system includes an air supply source in fluid communication with a plurality of tires of the vehicle. A pneumatic conduit extends between and is in fluid communication with the air supply source and the tires. Means are fluidly connected to the pneumatic conduit for enabling selective inflation and deflation of the tires. The means include a first pneumatic circuit for inflation of the tires, and a second pneumatic circuit for deflation of the tires. The second pneumatic circuit is discrete from the first pneumatic circuit and is common to more than one of the tires. The means provide controlled deflation of the tires in the second pneumatic circuit based upon a predetermined condition, enabling the tire inflation system to accommodate an increased pressure in the tires.

These objectives and others are obtained by the tire inflation system with discrete deflation circuit of the present invention. By way of additional example, the vehicle tire inflation system includes an air supply source in fluid communication with a plurality of tires of the vehicle. A pneumatic conduit extends between and is in fluid communication with the air supply source and the tires. A tire isolation pilot valve is in fluid communication with the pneumatic conduit and is equipped with means for monitoring a condition of the vehicle. The tire isolation pilot valve interrupts the fluid communication between the air supply source and the tires to pneumatically isolate the tires when the vehicle is in a parked condition, which minimizes a pneumatic pressure loss of the tires.

BRIEF DESCRIPTION OF THE SEVERAL VIEWS OF THE DRAWINGS

The preferred embodiments of the present invention, illustrative of the best mode in which Applicants have contemplated applying the principles, are set forth in the following description and are shown in the drawings, and are particularly and distinctly pointed out and set forth in the appended claims.

Similar numerals refer to similar parts throughout the drawings.

DETAILED DESCRIPTION OF THE INVENTION

The present invention is directed to a tire inflation system which includes a deflation circuit that is at least partially discrete or separate from an inflation circuit. The discrete deflation circuit enables controlled deflation of tires, based on specific predetermined conditions, which will be described below in the exemplary embodiments of the invention. Use of these specific predetermined conditions prevents deflation of the tires until the vehicle is parked, or limits the amount of deflation of the tires, which in turn prevents the tire pressure from falling below a minimum predetermined pressure, such as a minimum recommended pressure for a specific vehicle load as set by NHTSA and/or the tire manufacturer. It is to be understood that reference hereinbelow to the term target pressure means the desired target inflation pressure as selected by the vehicle operator based on the cold inflation pressure or cold pressure of the vehicle tires.

Figure 1A:
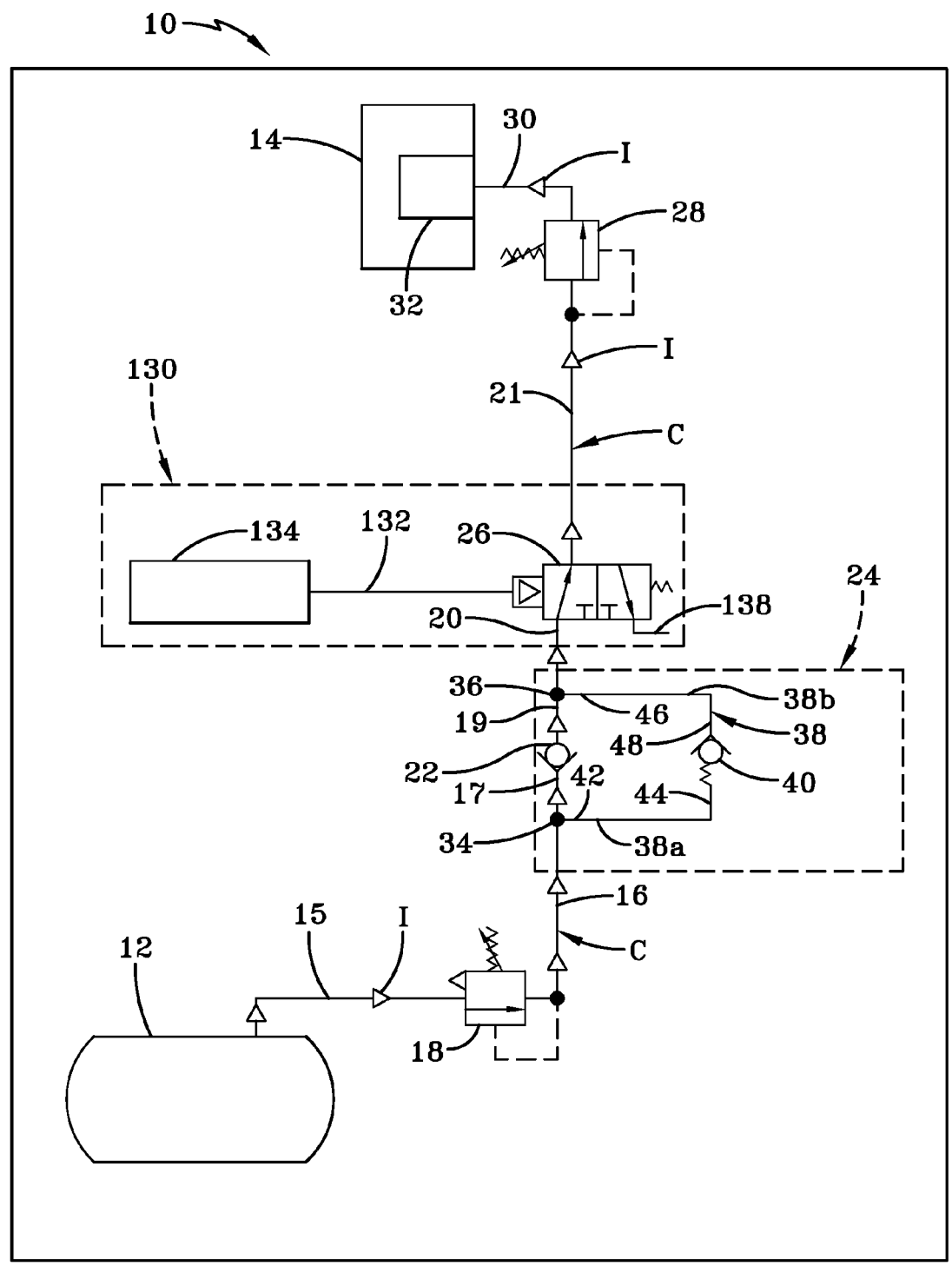
FIG. 1A is a schematic diagram of a first exemplary embodiment of the tire inflation system with discrete deflation circuit of the present invention, shown indicating an inflation mode.

Turning now to FIG. 1A, a first exemplary embodiment of the tire inflation system with discrete deflation circuit of the present invention is indicated generally at 10. FIG. 1A shows tire inflation system 10 in an inflation mode, and the direction of air flow is generally indicated by arrows I. Tire inflation system 10 includes a vehicle air supply or source 12 of pressurized or compressed air. Vehicle air supply 12 typically is a reservoir tank and will be referred to hereinbelow for the purpose of convenience as a supply tank. Supply tank 12 is connected, by components to be described in detail below, to vehicle tires 14. For the purpose of convenience, only a single tire 14 is illustrated in FIG. 1A, but it is to be understood that tire inflation system 10 typically is utilized with multiple tires. A pneumatic conduit represented generally by the letter C, and including specific conduit sections or portions to be described in greater detail below, extends between and interconnects components of tire inflation system 10.

More particularly, a first section 15 of pneumatic conduit C extends between and is fluidly connected to supply tank 12 and to a supply valve 18. A second section 16 of pneumatic conduit C is fluidly connected to and extends from supply valve 18. Supply valve 18 preferably is a mechanically-operated regulator that is mechanically adjustable to a setting that actuates or opens the valve at the target pressure. Preferably, valve 18 is biased to a typically closed position, and when the air pressure in second pneumatic conduit section 16 drops below the target pressure, supply valve 18 opens to enable air to flow through the valve, as known to those skilled in the art. Once supply valve 18 is open, air is delivered from supply tank 12, through first pneumatic conduit section 15, and to second pneumatic conduit section 16.

Once the target pressure is reached in second pneumatic conduit section 16, supply valve 18 closes, as known in the art. The setting at which supply valve 18 opens and closes to achieve the target pressure is adjustable by mechanical means, such as by rotation of a knob, set screw, stem, and the like by a technician or vehicle operator, depending on system requirements. Also based upon system requirements, the means for adjusting supply valve 18 may be placed in a convenient location inside the vehicle cab (not shown), or outside of the vehicle cab, such as on the trailer of a tractor-trailer. Supply valve 18 preferably also includes a flow switch (not shown), which can detect an air flow leak, as known in the art. As will be described in greater detail below, in the event that the target pressure is exceeded in second pneumatic conduit section 16, supply valve 18 vents to atmosphere. It is to be understood that supply valve 18 may be any mechanically-operated valve known to those skilled in the art which is suitable for controlling air flow in pneumatic conduit C.

When supply valve 18 is in an open position, pressurized air flows through the valve to second pneumatic conduit section 16, through a first tee fitting 34 of a deflation circuit 24, which will be described in greater detail below, and through a third section 17 of pneumatic conduit C that extends between and is fluidly connected to the first tee fitting and a first check valve 22. First check valve 22 is also part of deflation circuit 24. It is to be understood that deflation circuit 24 employs certain sections or portions of pneumatic conduit C and other components that are also used for inflation, as will be described in greater detail below. After flowing through first check valve 22, air flows through a fourth section 19 of pneumatic conduit C that extends between and is fluidly connected to the first check valve and a second tee fitting 36 of deflation circuit 24.

After flowing through second tee fitting 36 of deflation circuit 24, air flows through a fifth section 20 of pneumatic conduit C that extends between and is fluidly connected to the second tee fitting of deflation circuit 24 and an isolation pilot valve 26 of an optional tire isolation system 130. Optional tire isolation system 130 and isolation pilot valve 26 will also be described in greater detail below.

Once pressurized air flows through isolation pilot valve 26 of optional tire isolation system 130, it proceeds to a mechanically-operated wheel valve 28 through a sixth section 21 of pneumatic conduit C, which extends between and is fluidly connected to the isolation pilot valve and the wheel valve 28. Wheel valve 28 preferably is a diaphragm valve that isolates each tire 14 from the rest of tire inflation system. More particularly, wheel valve 28 preferably is spring biased and actuates or opens the wheel valve at a selected pressure setting or pressure level that is below the target pressure, thereby enabling maximum air flow to tires 14 from tire inflation system 10. This selected pressure setting or pressure level is less than the minimum pressure that would be expected to be utilized as a target tire pressure. In this manner, wheel valve 28 remains open during all normal operating conditions of the vehicle and the tire(s) 14, and closes in the event of an extreme condition, such as low or insufficient pressure in sixth pneumatic conduit section 21.

A seventh section 30 of pneumatic conduit C is fluidly connected to and extends between wheel valve 28 and a tire valve 32. Tire valve 32, which preferably is a Schrader valve, is pneumatically connected to tire 14 as known in the art. Tire valve 32 typically is spring-biased to a closed position, and typically is open only when mechanical means are employed to hold it open. Preferably, seventh pneumatic conduit section 30 includes a fitting (not shown) that holds tire valve 32 open by mechanical means while the seventh pneumatic conduit section is connected to the tire valve to enable inflation of tire 14. In this manner, when tire inflation system 10 is in an inflation mode, air flows via pneumatic conduit C from supply tank 12, through supply valve 18, isolation pilot valve 26 of optional tire isolation system 130, wheel valve 28, tire valve 32, and into tire 14.

Figure 1B:
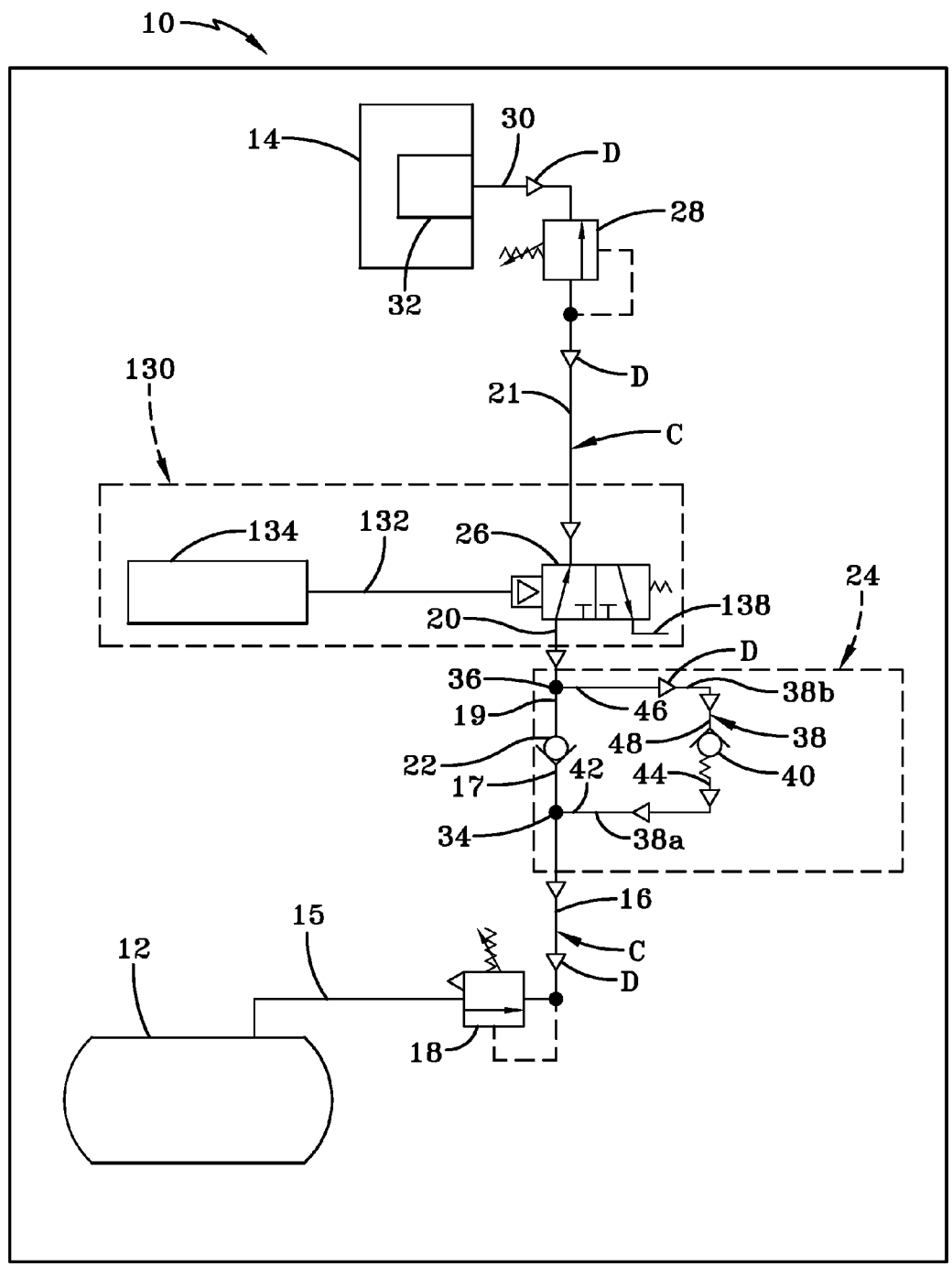
FIG. 1B is a schematic diagram of the embodiment of the tire inflation system shown in FIG. 1A, but shown indicating a deflation mode.

Turning now to FIG. 1B, first embodiment tire inflation system 10 is shown in a deflation mode, and the direction of air flow is generally indicated by arrows D. Deflation circuit 24 of first embodiment tire inflation system 10 employs a fixed differential deflation pressure as the condition under which deflation of tire 14 occurs, thereby enabling controlled deflation of the tire. More particularly, deflation circuit 24 is pneumatically connected to and includes certain sections or portions of pneumatic conduit C.

By way of example, in one type of configuration, deflation circuit 24 includes first and second pneumatic fittings 34 and 36, respectively, which preferably are tee fittings. First and second fittings 34 and 36 are spaced apart from one another and are fluidly connected to pneumatic conduit C. As described above, first tee fitting 34 is fluidly connected to and extends between second pneumatic conduit section 16 and third pneumatic conduit section 17, while second tee fitting 36 is fluidly connected to and extends between fourth pneumatic conduit section 19 and fifth pneumatic conduit section 20. First check valve 22 is disposed between first and second tee fittings 34 and 36, and is fluidly connected to third pneumatic conduit section 17 and fourth pneumatic conduit section 19. First check valve 22 enables air to flow in the direction from supply tank 12 to tires 14, but prevents air from flowing in the opposite direction, that is, from the tires to the supply tank.

Deflation circuit 24 further includes a deflation pneumatic conduit 38, which in turn includes a first deflation conduit section 38a and a second deflation conduit section 38b. First deflation conduit section 38a includes a first end 42 and a second end 44. First end 42 of first deflation conduit section 38a is fluidly connected to first tee fitting 34, which provides fluid communication between second pneumatic conduit section 16 and the first deflation conduit section. Second deflation conduit section 38b includes a first end 46 and a second end 48. First end 46 of second deflation conduit section 38b is fluidly connected to second tee fitting 36, which provides fluid communication between fifth pneumatic conduit section 20 and the second deflation conduit section.

Second end 44 of first deflation conduit section 38a is fluidly connected to a second check valve 40, and second end 48 of second deflation conduit section 38b is also fluidly connected to the second check valve. In this manner, second check valve 40 is fluidly connected to and extends between first deflation conduit section 38a and second deflation conduit section 38b. Second check valve 40 enables air to flow in the direction from tires 14 to supply tank 12, but prevents air from flowing in the opposite direction, that is, from the supply tank to the tires. In addition, second check valve 40 is biased to only allow air to flow from the direction of tires 14 to supply tank 12 when the pneumatic pressure in second deflation pneumatic conduit section 38b is at least a fixed differential or predetermined amount greater than the target pressure. This fixed differential or predetermined amount is referred to herein as X.

An example of a preferred fixed differential X is the difference between the cold pressure of the tires and the operating pressure of the tires. As described above, when the heavy-duty vehicle has been parked for a period of time, the air pressure in the tires of the vehicle moves to a pressure level that is referred to as the cold pressure. The cold pressure typically is the recommended pressure from the tire manufacturer for a specific axle load. Then, as the vehicle travels over-the-road, the energy and forces associated with the travel cause the temperature of each vehicle tire to increase. When the temperature of the tire increases, the air inside the tire expands. Because the volume of the tire is limited, the expansion of air causes the air pressure inside the tire to increase. This increased air pressure is typically referred to as the operating pressure of the tires. Often, the operating pressure of the tires of a typical heavy-duty vehicle dual-wheel configuration is about fifteen (15) pounds per square inch (psi) greater or higher than the cold pressure of the tires, as NHTSA recommends adding about 15 psi to a cold pressure setting when checking pressure while the tires are at their operating temperature. As a result, a preferred fixed differential X is the difference between the cold pressure and the operating pressure, that is, about 15 psi.

Of course, other pressure amounts or levels that account for the difference between the cold pressure and the operating pressure of a specific tire or tire arrangement are contemplated by tire inflation system of the present invention 10, without affecting the concept or operation of the invention.

The desirable effect of the use of fixed differential X in deflation circuit 24 of first embodiment tire inflation system 10 is illustrated by the operation of the system. More particularly, as described above, the vehicle operator or a technician selects a target pressure by adjusting supply valve 18 using means that are placed in a convenient location inside the vehicle cab, or outside of the vehicle cab, such as on the trailer of a tractor-trailer, depending on system requirements. As shown in FIG. 1A, when inflation of tires 14 is required, supply valve 18 is opened or actuated, enabling air to flow from supply tank 12, through first pneumatic conduit section 15, through the supply valve and to second pneumatic conduit section 16, first tee fitting 34 of deflation circuit 24 and third pneumatic conduit section 17. First check valve 22 ensures that air continues to flow from third pneumatic conduit section 17 through fourth pneumatic conduit section 19 to second tee fitting 36 of deflation circuit 24, through fifth pneumatic conduit section 20 and to isolation pilot valve 26 of optional tire isolation system 130. Air then flows through sixth pneumatic conduit section 21, wheel valve 28, seventh pneumatic conduit section 30, and into tires 14. Second check valve 40 ensures that air flows through second, third, fourth and fifth pneumatic conduit sections 16, 17, 19 and 20, respectively during the inflation process, rather than flowing through deflation conduit 38. Once the target pressure is reached, supply valve 18 closes. Because tire inflation system 10 is a constant-pressure system, pneumatic pressure remains in second, third, fourth, fifth, sixth and seventh pneumatic conduit sections 16, 17, 19, 20, 21 and 30, respectively, and tires 14.

If the pneumatic pressure in tires 14 increases, deflation of the tires may be necessary. In the prior art tire inflation systems that are not capable of deflation, tires 14 may operate in a significantly over-inflated condition, which undesirably decreases their performance and in turn decreases the life of the tires. In tire inflation systems of the prior art that are capable of deflation, the lack of ability to accommodate an increased tire pressure causes the systems to deflate tires 14 down from the optimum operating pressure to the lower cold-tire target pressure, which also undesirably decreases tire performance. However, deflation circuit 24 of first embodiment tire inflation system 10 limits deflation of tires 14 below a minimum predetermined pressure, such as a minimum recommended pressure for a specific vehicle load as set by NHTSA and/or the tire manufacturer, which optimizes tire performance.

More specifically, as shown in FIG. 1B, first check valve 22 prevents air from flowing in the direction from tires 14 to supply tank 12. Thus, when the pneumatic pressure in tires 14 increases, the pressure increases in seventh, sixth, fifth and fourth pneumatic conduit sections 30, 21, 20 and 19, respectively, to first check valve 22. First check valve 22 prevents the increased pressure from proceeding directly through third and second pneumatic conduit sections 17 and 16, respectively, to supply valve 18. In this manner, first check valve 22 prevents supply valve 18 from exhausting air from second, third, fourth, fifth, sixth and seventh pneumatic conduit sections 16, 17, 19, 20, 21 and 30, and thus tires 14, down to a pressure that is below a recommended level.

Rather than reaching supply valve 18, air flows through second deflation conduit section 38b to second check valve 40. Second check valve 40 only allows air to pass or flow through it if the pneumatic pressure is fixed differential X greater than the target pressure. For example, using a fixed differential X of 15 psi, which is the difference between the cold pressure and the operating pressure of tires 14, second check valve 40 only allows air to flow through it when the pneumatic pressure is greater than the target pressure plus 15 psi. When the pneumatic pressure is greater than the target pressure plus 15 psi, air flows through second check valve 40, through first deflation conduit section 38a, through second pneumatic conduit section 16 and to supply valve 18. Supply valve 18 then exhausts air until the pressure in second pneumatic conduit section 16 drops below a level of the target pressure plus 15 psi, which then causes second check valve 40 to close and thus prevent further deflation.

In this manner, first embodiment tire inflation system 10 provides a constant-pressure system that includes discrete deflation circuit 24. Discrete deflation circuit 24 accommodates an increased tire pressure due to operating conditions by enabling deflation of tires 14 to be controlled, employing fixed differential deflation pressure X to prevent deflation of the tires below a minimum predetermined pressure, such as a minimum recommended pressure for a specific vehicle load as set by NHTSA and/or the tire manufacturer. In addition, by being a constant-pressure system and using mechanical components that are mechanically and/or pneumatically actuated, rather than components that are electrically actuated and rely on the electrical system of the trailer, first embodiment tire inflation system 10 is more reliable, more economical, and is easier to install and use than the electrically-actuated and electrically-controlled systems of the prior art.

It is to be understood that deflation circuit 24 of first embodiment tire inflation system 10 has been described with reference to the use of separate check valves 22, 40, tee fittings 34, 36, and conduit sections 16, 17, 19, 20, 38a, 38b for the purposes of clear illustration of the invention. Preferably, check valves 22, 40 are incorporated into a single or integrated valve body with corresponding passages in the valve body, thereby eliminating one or more of tee fittings 34, 36 and conduit sections 16, 17, 19, 20, 38a, 38b, without affecting the overall concept or operation of the invention.

In addition, as described above, check valve 40 is biased to allow air to flow from the direction of tires 14 to supply tank 12 when the pneumatic pressure in second deflation pneumatic conduit section 38b is at least fixed differential X greater than the target pressure. Preferably, rather than employing supply valve 18 in combination with separate first check valve 22 and second check valve 40, the use of fixed differential X by deflation circuit 24 is accomplished through the use of a relieving regulator with a built-in hysteresis for the supply valve. Such a construction eliminates check valves 22, 40 and associated tee fittings 34, 36 and conduit sections 17, 19, 38a, and 38b, without affecting the overall concept or operation of the invention. A relieving regulator with a built-in hysteresis for supply valve 18 can be accomplished using several types of structures.

Figure 7:
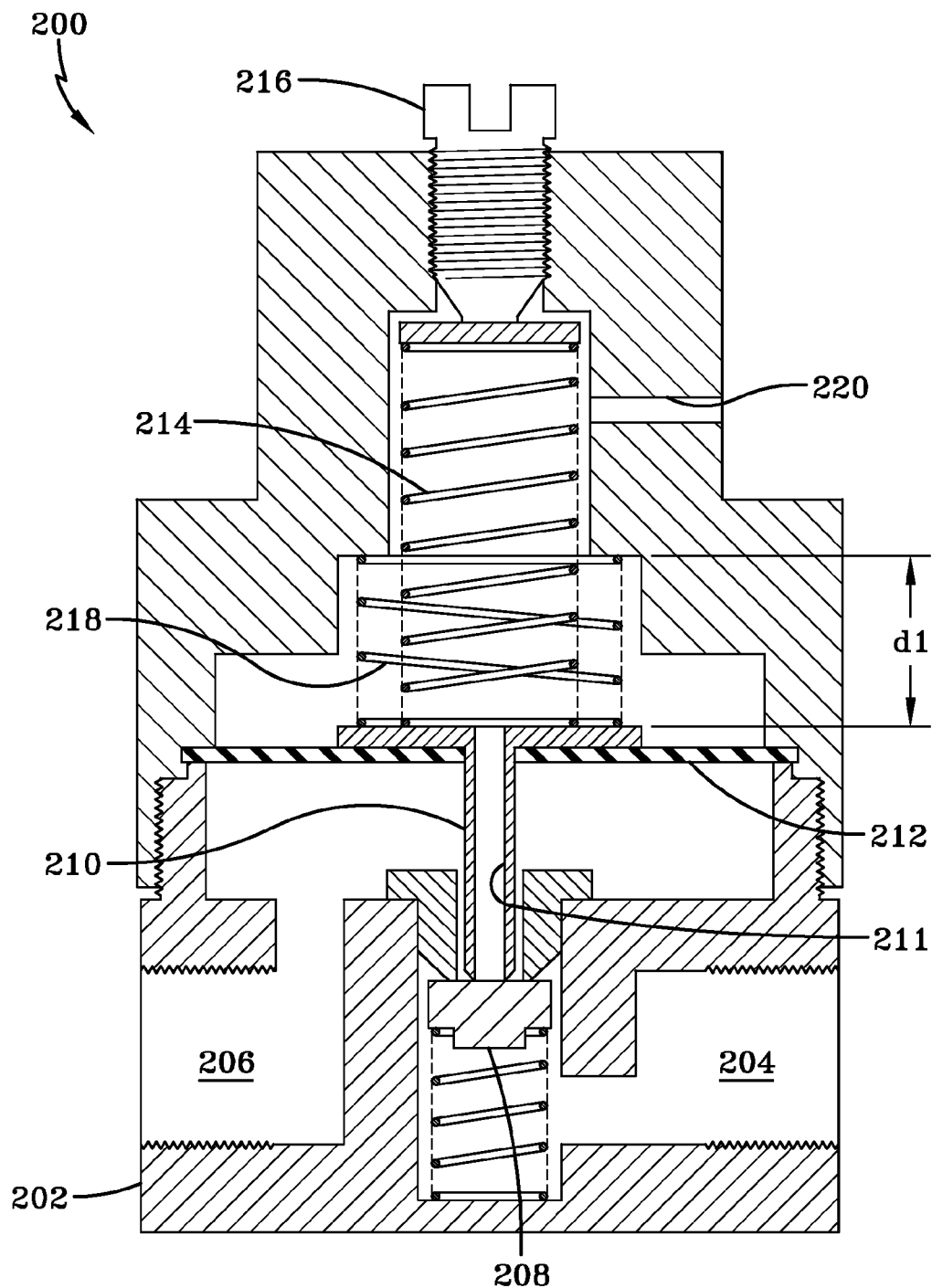
FIG. 7 is a schematic representation of a cross-sectional view of an exemplary relieving regulator for use in the first and third exemplary embodiments of the tire inflation system with discrete deflation circuit of the present invention, shown in FIGS. 1A-1B and 3A-3B.

A first exemplary relieving regulator with a built-in hysteresis 200 is shown in FIG. 7, and includes a body 202. A supply chamber 204 is formed in body 202, and is in selective fluid communication with an outlet chamber 206 that is also formed in the body. Disposed between supply chamber 204 and outlet chamber 206 is a supply check member 208. A pneumatic relief piston 210 selectively mechanically contacts supply check member 208, and is mechanically connected to a diaphragm 212 and a primary main spring 214. Adjustment of primary main spring 214 is provided by adjustment of a pressure adjustment screw 216. In an inflation mode, the pneumatic pressure in outlet chamber 206 is not sufficient to overcome the bias of primary main spring 214, so that the primary main spring moves diaphragm 212 in a downward direction. Downward movement of diaphragm 212 in turn moves pneumatic relief piston 210 and supply check member 208 downwardly, thereby enabling air to flow from supply chamber 204 past the supply check member to outlet chamber 206, and out of regulator 200.

Relieving regulator 200 also employs a secondary main spring 218 with a standing height, indicated by d1. Secondary main spring 218 resists diaphragm 212 when the diaphragm moves from a neutral position to a relieving position. More particularly, in a deflation or relieving mode, air enters regulator 200 through outlet chamber 206 and causes diaphragm 212 to move in an upward direction when the pneumatic pressure overcomes the bias of primary main spring 214 and secondary main spring 218. Upward movement of diaphragm causes relief piston 210 to move upwardly, which creates a gap between the relief piston and supply check member 208. Air then flows through the gap between relief piston 210 and supply check member 208, through a central bore 211 formed in the relief piston, and through an exhaust passage 220. As a result, with the use of secondary main spring 218, the force that is required to relieve pneumatic pressure is greater than the force that is required to deliver pneumatic pressure. By adjusting the spring rate of secondary main spring 218, the hysteresis can be controlled. Preferably, secondary main spring 218 does not extend to pressure adjustment screw 216, so that adjustment of primary main spring 214 by the pressure adjustment screw does not affect the secondary main spring.

Figure 8:
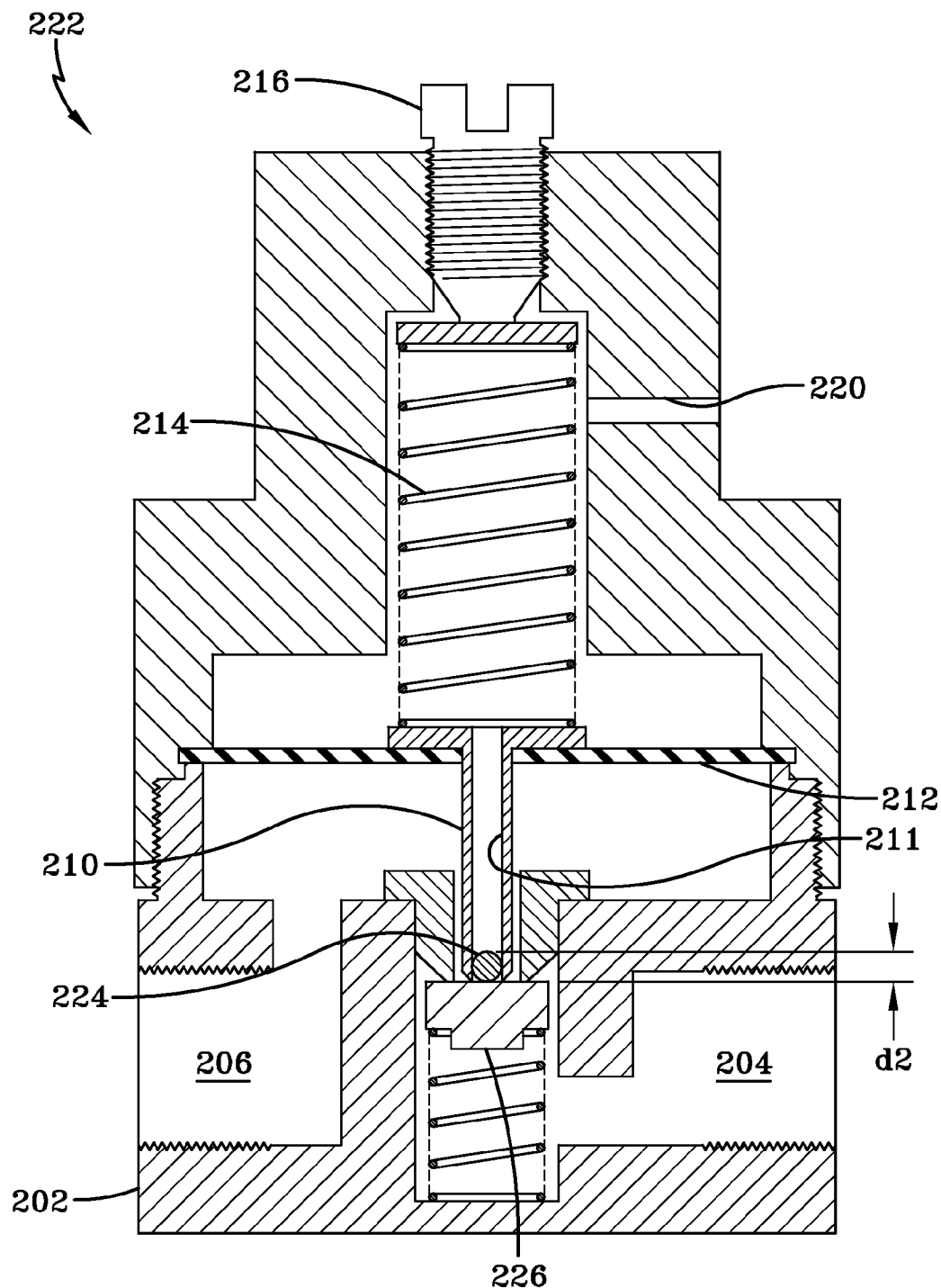
FIG. 8 is a schematic representation of a cross-sectional view of another exemplary relieving regulator for use in the first and third exemplary embodiments of the tire inflation system with discrete deflation circuit of the present invention, shown in FIGS. 1A-1B and 3A-3B.

A second exemplary relieving regulator with a built-in hysteresis 222 is shown in FIG. 8, and is similar in construction and operation to first exemplary relieving regulator 200 (FIG. 7). However, rather than employing secondary main spring 218, relieving regulator 222 employs a supply check member 226 that includes a supply check poppet 224, which is mechanically attached to the supply check member. Supply check poppet 224 is aligned with the central bore of relief piston 210, as shown in FIG. 8. Alternatively, supply check poppet 224 may surround the outside diameter of relief piston 210. Supply check poppet 224 requires diaphragm 212 to move an upward distance or displacement indicated by d2 before allowing air to flow through central bore 211 of relief piston 210 and through exhaust passage 220. By requiring diaphragm 212 to move distance d2 from a neutral position before regulator 222 starts to relieve air, supply check poppet 224 in turn requires the force to relieve pneumatic pressure to be greater than the force to deliver pneumatic pressure. By requiring movement of distance d2, supply check poppet 224 essentially provides resistance against movement of diaphragm 212 that is in addition to the initial resistance provided by primary main spring 214 to relieve pneumatic pressure.

Figure 2A:
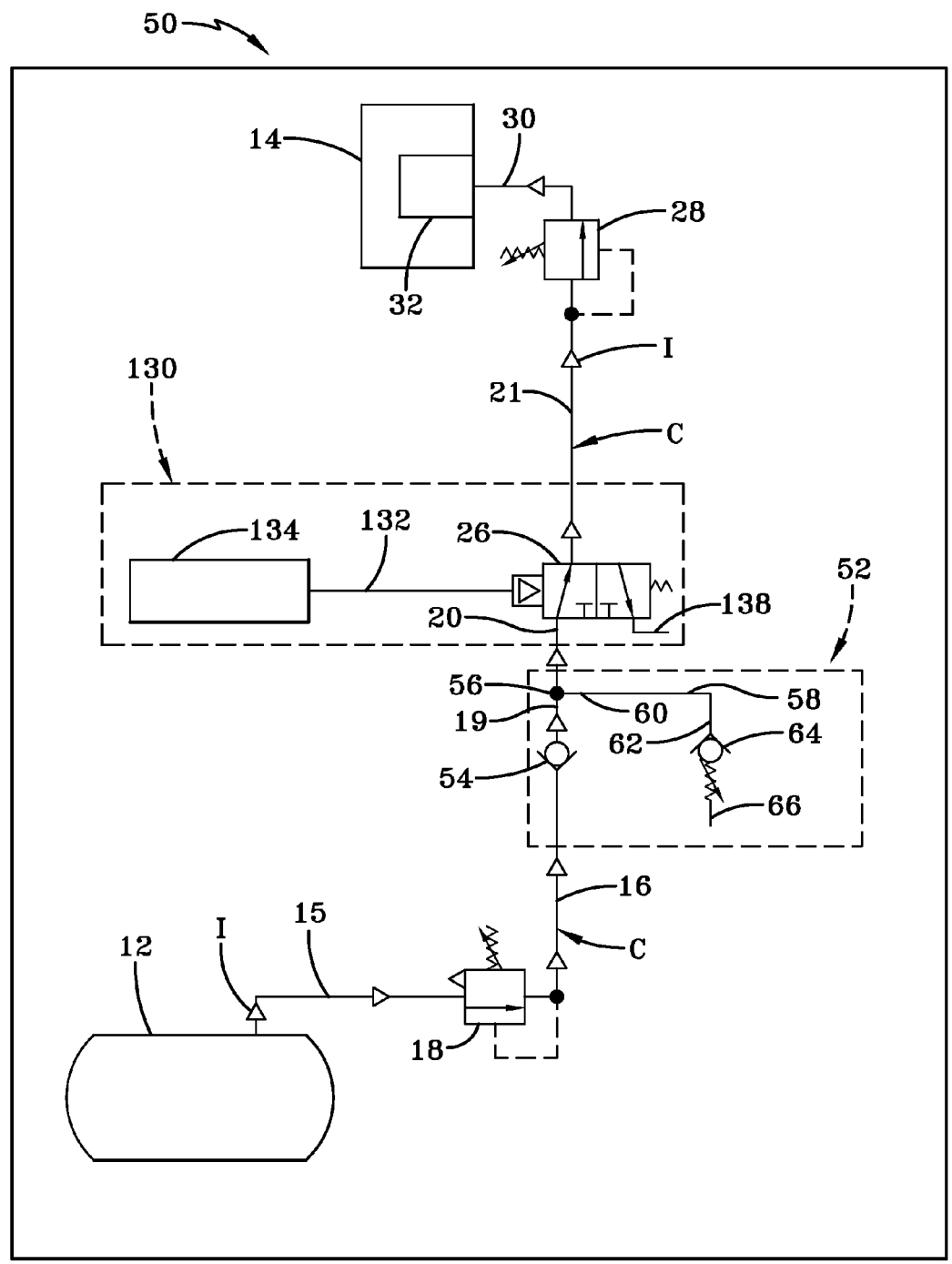
FIG. 2A is a schematic diagram of a second exemplary embodiment of the tire inflation system with discrete deflation circuit of the present invention, shown indicating an inflation mode.

With reference now to FIG. 2A, a second exemplary embodiment of the tire inflation system with discrete deflation circuit of the present invention is indicated generally at 50. FIG. 2A shows tire inflation system 50 in an inflation mode, and the direction of air flow is generally indicated by arrows I. Second embodiment tire inflation system 50 is generally similar in structure and operation to first embodiment tire inflation system 10, with the exception that the second embodiment tire inflation system employs a deflation circuit 52 and a predetermined condition that are different from the first embodiment tire inflation system. As a result, only the differences between second embodiment tire inflation system 50 and first embodiment tire inflation system 10 will be described below.

Second embodiment tire inflation system 50 employs a variable deflation pressure as the condition under which deflation occurs, as opposed to fixed differential deflation pressure X employed by first embodiment tire inflation system 10. More particularly, deflation circuit 52 is pneumatically connected to and includes a portion of pneumatic conduit C. By way of example, in one type of configuration, deflation circuit 52 also includes a first check valve 54, which is fluidly connected to second pneumatic conduit section 16. Because second pneumatic conduit section 16 extends to first check valve 54 without a tee fitting, second embodiment tire inflation system 50 eliminates third pneumatic conduit section 17 (FIG. 1A), which is employed in first embodiment tire inflation system 10.

First check valve 54 of second embodiment tire inflation system 50 enables air to flow in the direction from supply tank 12 to tires 14, but prevents air from flowing in the opposite direction, that is, from the tires to the supply tank. Fourth pneumatic conduit section 19 is fluidly connected to and extends between first check valve 54 and a pneumatic fitting 56, which preferably is a tee fitting. Fifth pneumatic conduit section 20 is fluidly connected to and extends between tee fitting 56 and isolation valve 26 of optional tire isolation system 130.

Deflation circuit 52 further includes a deflation pneumatic conduit 58. Deflation pneumatic conduit 58 includes a first end 60 and a second end 62. First end 60 of deflation pneumatic conduit 58 is fluidly connected to tee fitting 56, which provides fluid communication between fifth pneumatic conduit section 20 and the deflation pneumatic conduit. Second end 62 of deflation pneumatic conduit 58 is fluidly connected to a second check valve 64.

Figure 2B:
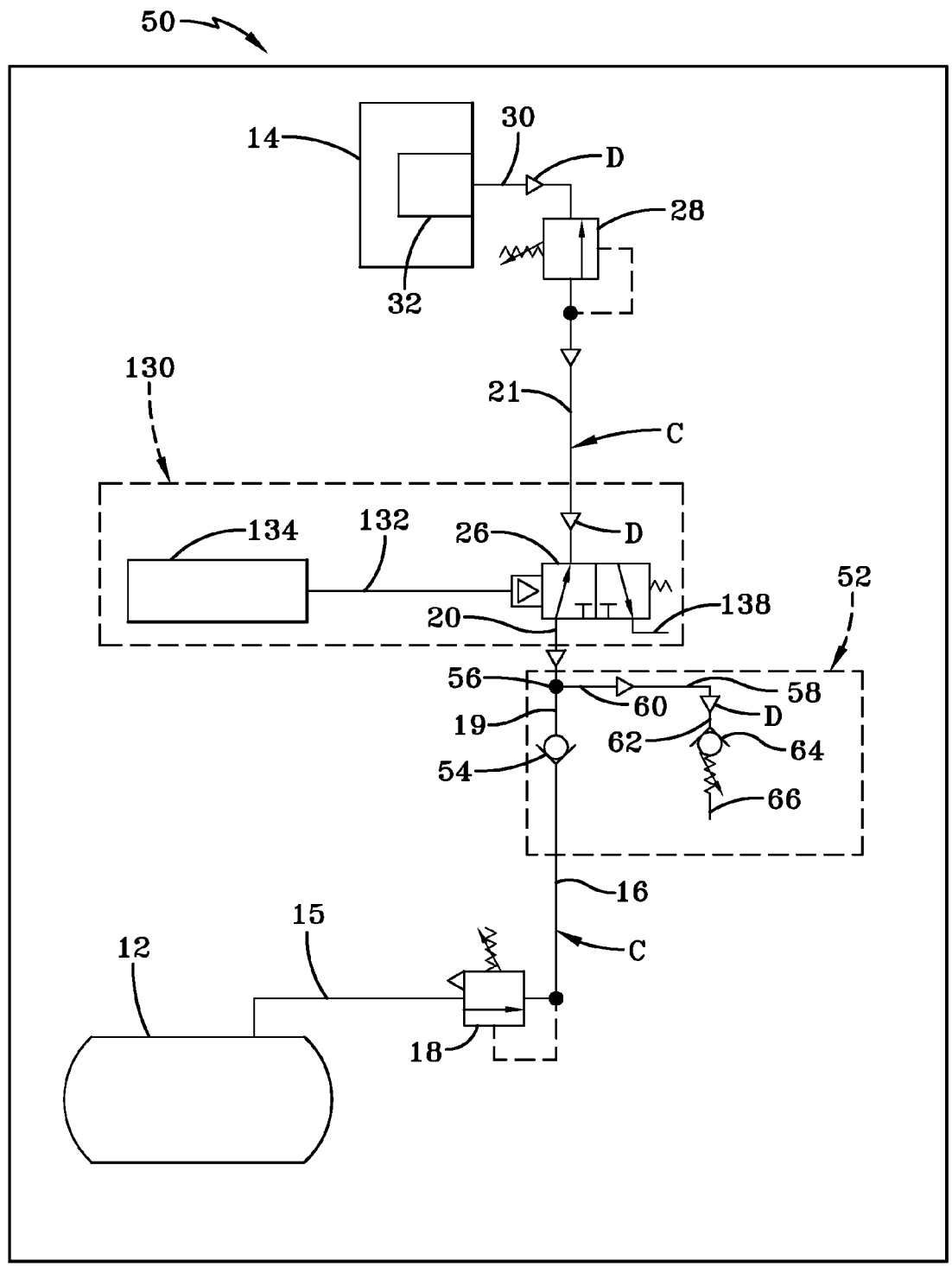
FIG. 2B is a schematic diagram of the embodiment of the tire inflation system shown in FIG. 2A, but shown indicating a deflation mode.

Turning now to FIG. 2B, second embodiment tire inflation system 50 is shown in a deflation mode, and the direction of air flow is generally indicated by arrows D. Second check valve 64 allows air to flow in the direction from tires 14 to the second check valve to exhaust air directly to atmosphere 66 upon reaching a predetermined condition. More particularly, second check valve 64 is adjustable by mechanical means, such as by rotation of a knob, set screw, stem, and the like, to a setting that actuates or opens the check valve at a predetermined pressure level. The means for adjusting second check valve 64 may be placed in a convenient location inside the vehicle cab (not shown) or outside of the vehicle cab, such as on the trailer of a tractor-trailer, depending on system requirements. This pressure level is a predetermined level, referred to herein as Y. Predetermined level Y is adjustable by a vehicle operator or technician for a specific vehicle load and/or travel conditions through adjustment of second check valve 64, and thus is a variable deflation pressure employed by deflation circuit 52. For example, a preferred pressure level Y is the cold-tire target pressure plus 15 psi, so that if the target pressure is 100 psi, Y would be 115 psi.

The desirable effect of the use of variable deflation pressure Y in deflation circuit 52 of second embodiment tire inflation system 50 is illustrated by the operation of the system. More particularly, as described above, the vehicle operator or a technician selects a target pressure, which is based on a cold inflation pressure, by adjusting supply valve 18. As shown in FIG. 2A, when inflation of tires 14 is required, supply valve 18 is opened or actuated, enabling air to flow from supply tank 12, through first pneumatic conduit section 15, through the supply valve and to second pneumatic conduit section 16. First check valve 54 ensures that air continues to flow through second pneumatic conduit section 16 to fourth pneumatic conduit section 19, tee fitting 56, fifth pneumatic conduit section 20, optional tire isolation pilot valve 26, sixth pneumatic conduit section 21, wheel valve 28, seventh pneumatic conduit section 30, and into tires 14. Once the target pressure is reached, supply valve 18 closes. Because tire inflation system 50 is a constant-pressure system, pneumatic pressure remains in second, fourth, fifth, sixth and seventh pneumatic conduit sections 16, 19, 20, 21 and 30, respectively, and tires 14.

If the pneumatic pressure in tires 14 increases, deflation of the tires may be necessary. In the prior art tire inflation systems that are not capable of deflation, tires 14 may operate in a significantly over-inflated condition, which undesirably decreases their performance and in turn decreases the life of the tires. In tire inflation systems of the prior art that are capable of deflation, the lack of ability to accommodate an increased tire pressure causes the systems to deflate tires 14 down from the optimum operating pressure to the lower cold-tire target pressure, which undesirably decreases tire performance. However, deflation circuit 52 limits deflation of tires 14 below a minimum predetermined pressure, such as a minimum recommended pressure for a specific vehicle load as set by NHTSA and/or the tire manufacturer, which optimizes tire performance.

More specifically, as shown in FIG. 2B, first check valve 54 prevents air from flowing in the direction from tires 14 to supply tank 12. Thus, when the pneumatic pressure in tires 14 increases, the pressure increases in seventh, sixth, fifth and fourth pneumatic conduit sections 30, 21, 20 and 19, respectively, to first check valve 54. First check valve 54 prevents the increased pressure from proceeding directly through second pneumatic conduit section 16 to supply valve 18. In this manner, first check valve 54 prevents supply valve 18 from exhausting air from second, fourth, fifth, sixth and seventh pneumatic conduit section 16, 19, 20, 21 and 30, and thus tires 14, down to a pressure that is below a recommended level.

Rather than reaching supply valve 18, air flows through deflation pneumatic conduit 58 to second check valve 64. Second check valve 64 only allows air to pass or flow through it if the pneumatic pressure in deflation pneumatic conduit 58 is predetermined level Y psi. When the pneumatic pressure is greater than predetermined level Y, which is greater than the cold-tire target pressure, air flows through second check valve 64 and is exhausted to atmosphere 66 until the pneumatic pressure is reduced to predetermined level Y psi. Once the pneumatic pressure in deflation pneumatic conduit 58 drops below a level of Y psi, second check valve 64 closes and thus prevents further deflation.

In this manner, second embodiment tire inflation system 50 provides a constant-pressure system that includes discrete deflation circuit 52. Discrete deflation circuit 52 accommodates an increased tire pressure due to operating conditions by enabling deflation of tires 14 to be controlled, employing variable deflation pressure Y to prevent deflation of the tires below a minimum predetermined pressure, such as a minimum recommended pressure for a specific vehicle load as set by NHTSA and/or the tire manufacturer. In addition, by being a constant-pressure system and using mechanical components that are mechanically and/or pneumatically actuated, rather than components that are electrically actuated and rely on the electrical system of the trailer, second embodiment tire inflation system 50 is more reliable, more economical, and is easier to install and use than the electrically-actuated and electrically-controlled systems of the prior art.

It is to be understood that deflation circuit 52 of second embodiment tire inflation system 50 has been described with reference to the use of separate check valves 54, 64, tee fitting 56, and conduit sections 16, 19, 20, 58 for the purposes of clear illustration of the invention. Preferably, check valve 54, 64 are incorporated into a single or integrated valve body with corresponding passages in the valve body, thereby eliminating tee fitting 56 and/or one or more conduit sections 16, 19, 20, 58, without affecting the overall concept or operation of the invention. In addition, as described above, second check valve 64 is mechanically adjustable to exhaust air directly to atmosphere 66 upon reaching predetermined condition Y. Preferably, rather than employing supply valve 18 in combination with separate first check valve 54 and second check valve 64, the adjustability to achieve predetermined pressure level Y is accomplished by combining the mechanical adjustment of second check valve 64 in supply valve 18, with a common mechanical drive for the supply valve and the second check valve. Because of the difference between cold tire target pressure and operating pressure, as described in detail above, the target pressure and the predetermined pressure level preferably are adjusted simultaneously.

Figure 3A:
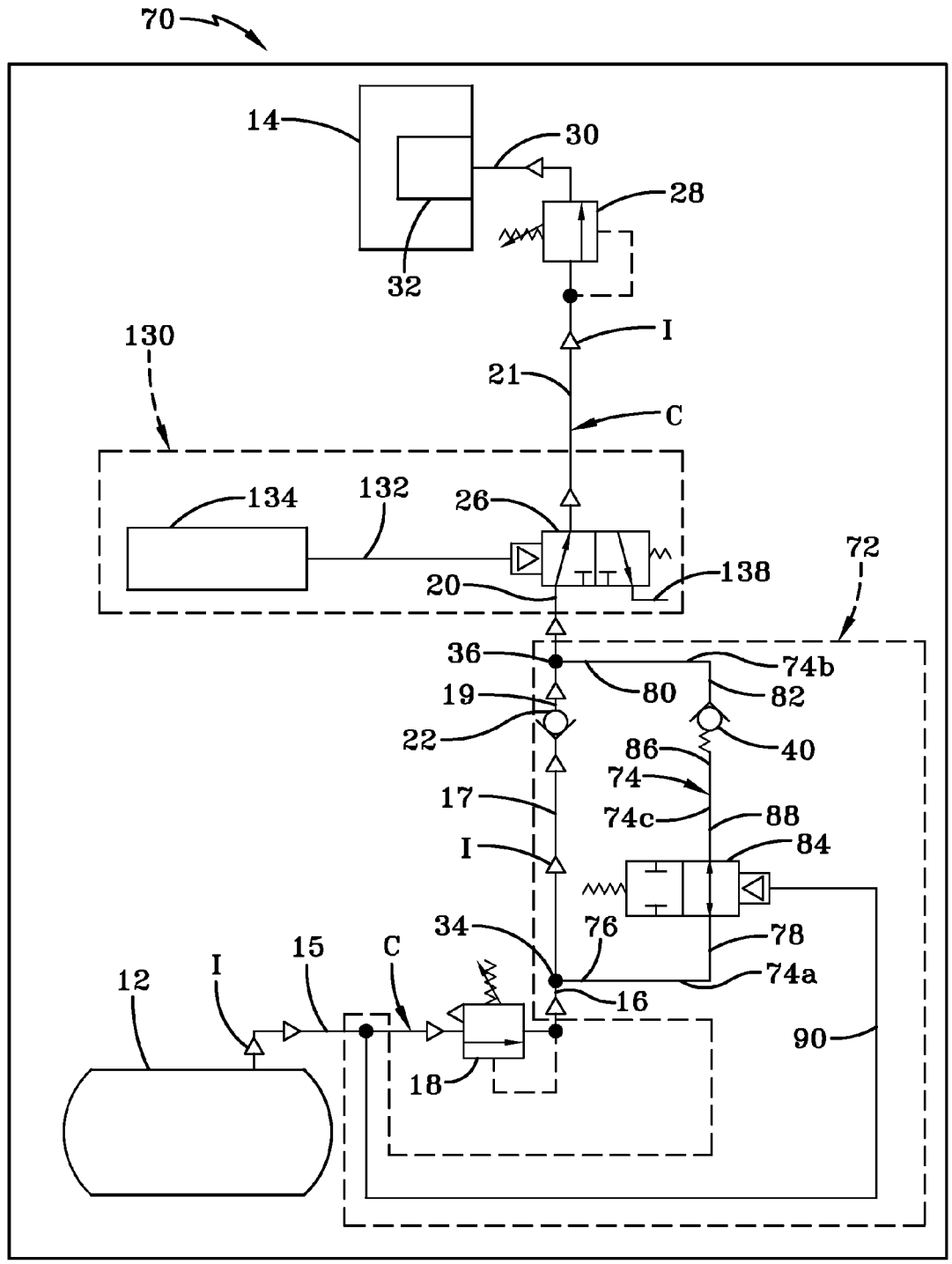
FIG. 3A is a schematic diagram of a third exemplary embodiment of the tire inflation system with discrete deflation circuit of the present invention, shown indicating an inflation mode.

Turning now to FIG. 3A, a third exemplary embodiment of the tire inflation system with discrete deflation circuit of the present invention is indicated generally at 70. FIG. 3A shows third embodiment tire inflation system 70 in an inflation mode, and the direction of air flow is generally indicated by arrows I. Third embodiment tire inflation system with discrete deflation circuit 70 is generally similar in structure and operation to first and second embodiments tire inflation system 10, 50, respectively, with the exception that the third embodiment tire inflation system employs a deflation circuit 72 and a predetermined condition that are different from the first and second embodiments of the tire inflation system. As a result, only the differences between third embodiment tire inflation system 70 and first embodiment tire inflation system 10 will be described below.

Third embodiment tire inflation system 70 employs a fixed differential deflation pressure similar to fixed differential deflation pressure X of first embodiment tire inflation system 10, and further includes monitoring of the supply pressure. More particularly, deflation circuit 72 is pneumatically connected to and includes a portion of pneumatic conduit C. By way of example, in one type of configuration, similar to deflation circuit 24 of first embodiment tire inflation system 10 (FIG. 1A), deflation circuit 72 of third embodiment tire inflation system 70 includes first and second tee fittings 34 and 36, which are spaced apart from one another and are fluidly connected to pneumatic conduit C. First tee fitting 34 is fluidly connected to and extends between second pneumatic conduit section 16 and third pneumatic conduit section 17, while second tee fitting is fluidly connected to and extends between fourth pneumatic conduit section 19 and fifth pneumatic conduit section 20. First check valve 22 is disposed between first and second tee fittings 34 and 36, and is fluidly connected to third pneumatic conduit section 17 and fourth pneumatic conduit section 19. First check valve 22 enables air to flow in the direction from supply tank 12 to tires 14, but prevents air from flowing in the opposite direction, that is, from the tires to the supply tank.

Deflation circuit 72 further includes a deflation pneumatic conduit 74, which in turn includes a first deflation conduit section 74a, a second deflation conduit section 74b, and a third deflation conduit section 74c. First deflation conduit section 74a includes a first end 76 and a second end 78. First end 76 of first deflation conduit section 74a is fluidly connected to first tee fitting 34, which provides fluid communication between second pneumatic conduit section 16 and the first deflation conduit section. Second end 78 of first deflation conduit section 74a is fluidly connected to a supply override valve 84, which will be described in greater detail below.

Second deflation conduit section 74b includes a first end 80 and a second end 82. First end 80 of second deflation conduit section 74b is fluidly connected to second tee fitting 36, which provides fluid communication between fifth pneumatic conduit section 20 and the second deflation conduit section. Second end 82 of second deflation conduit section 74b is fluidly connected to second check valve 40, similar to deflation circuit 24 of first embodiment tire inflation system 10.

Third deflation conduit section 74c includes a first end 86 and a second end 88. First end 86 of third deflation conduit section 74c is fluidly connected to second check valve 40, and second end 88 of the third deflation conduit section is fluidly connected to supply override valve 84. In this manner, third deflation conduit section 74c extends between second check valve 40 and supply override valve 84.

Figure 3B:
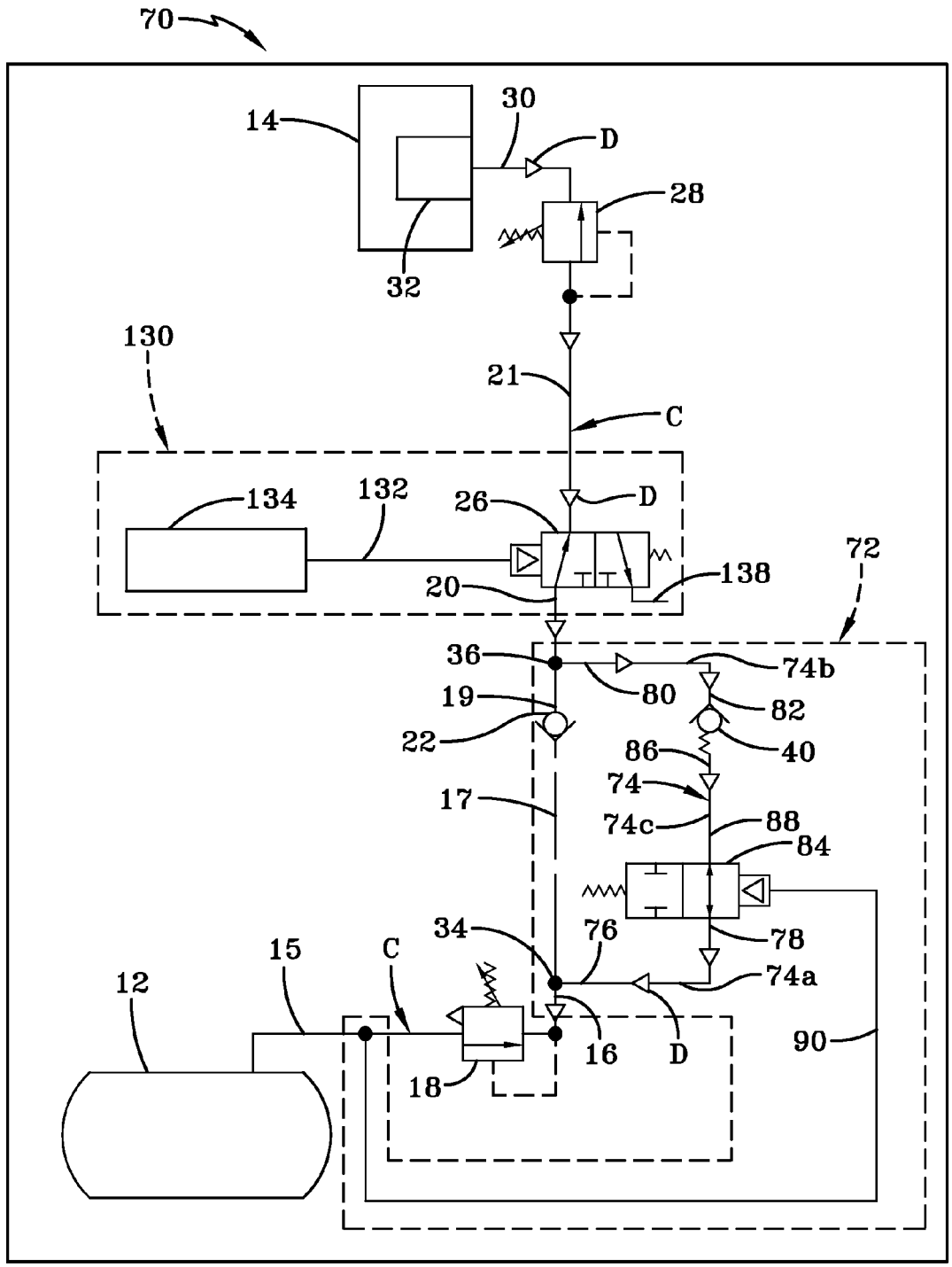
FIG. 3B is a schematic diagram of the embodiment of the tire inflation system shown in FIG. 3A, but shown indicating a deflation mode.

Similar to deflation circuit 24 of first embodiment tire inflation system 10, second check valve 40 prevents air from flowing in the direction from supply tank 12 to tires 14, and is biased to allow air to flow from the direction of the tires to the supply tank only when the pneumatic pressure in second deflation pneumatic conduit section 74b is greater than predetermined amount or fixed differential X over the target pressure. Turning to FIG. 3B, in which third embodiment tire inflation system 70 is shown in a deflation mode and the direction of air flow is generally indicated by arrows D, when the pneumatic pressure is greater than the target pressure plus fixed differential X psi, air flows through second check valve 40 and through third deflation conduit section 74c to supply override valve 84.

Supply override valve 84 is shown in FIGS. 3A and 3B in an energized state. Supply override valve 84 monitors the pneumatic pressure in first pneumatic conduit section 15, and thus the pressure that is available from supply tank 12. More particularly, a supply monitoring pneumatic conduit 90 extends between and is fluidly connected to supply override valve 84 and first pneumatic conduit section 15. The connection of supply override valve 84 to first pneumatic conduit section 15 enables the supply override valve to detect the pneumatic pressure in the first pneumatic conduit section and thus supply tank 12. This detection prevents deflation of tires 14 if the pneumatic pressure in supply tank 12 is below a minimum desired pressure level to increase the likelihood that the air pressure in the tires remains above a minimum recommended pressure, as will be described in greater detail below.

For example, if the minimum desired pressure level of supply tank 12 is 115 psi, supply override valve 84 is able to detect the pressure level of the supply tank through the connection of supply monitoring pneumatic conduit 90 to first pneumatic conduit section 15. Supply override valve 84 preferably is a spring-biased pilot valve, so that when the valve detects a pressure level from first pneumatic conduit section 15 that is below 115 psi, the valve remains closed (FIG. 3B), thereby preventing exhaustion of air from second check valve 40, which in turn prevents deflation of tires 14. When supply override valve 84 detects a pressure level from first pneumatic conduit section 15 that is at or above 115 psi, the valve actuates and thus opens. When supply override valve 84 is open, air flows through the supply override valve 84, through first deflation conduit section 74a to second pneumatic conduit section 16 and to supply valve 18. Supply valve 18 then exhausts air until the pressure in second pneumatic conduit section 16 drops below a level of the target pressure plus fixed differential X psi, which then causes second check valve 40 to close and prevent further deflation. During deflation, if the pneumatic pressure in supply tank 12 drops below the minimum tank pressure, supply override valve 84 closes to prevent further deflation.

The use of supply override valve 84 thus prevents deflation of tires 14 when the pneumatic pressure in supply tank 12 is below a minimum pressure level. This prevention of deflation is desirable because if the pressure level in supply tank 12 becomes low due to air consumption from braking, it is possible that the supply tank may not be able to provide enough air to enable tires 14 to be inflated to the target pressure. If supply tank 12 does not have such sufficient air pressure, it is possible that tire inflation system 70 may actually undesirably remove or deflate air from tires 14, which in turn would undesirably reduce the pressure in the tires to a level that is below the desired operating pressure. By limiting the amount of deflation that can occur, supply override valve 84 increases the likelihood that the air pressure in tires 14 remains above a minimum recommended pressure for a specific vehicle load as set by NHTSA and/or the tire manufacturer.

In this manner, third embodiment tire inflation system 70 provides a constant-pressure system that includes discrete deflation circuit 72. Discrete deflation circuit 72 accommodates an increased tire pressure due to operating conditions by enabling deflation of tires 14 to be controlled, employing fixed differential deflation pressure X to prevent deflation of the tires below a minimum predetermined pressure, such as a minimum recommended pressure for a specific vehicle load as set by NHTSA and/or the tire manufacturer. In addition, third embodiment tire inflation system 70 provides monitoring of the supply pressure to prevent exhaustion of air from tires 14 when the pneumatic pressure in supply tank 12 is low, thereby increasing the likelihood that the air pressure in the tires will remain above a minimum recommended pressure. Moreover, by being a constant-pressure system and using mechanical components that are mechanically and/or pneumatically actuated, rather than components that are electrically actuated and rely on the electrical system of the trailer, third embodiment tire inflation system 70 is more reliable, more economical, and is easier to install and use than the electrically-actuated and electrically-controlled systems of the prior art.

It is to be understood that deflation circuit 72 of third embodiment tire inflation system 70 has been described with reference to the use of separate check valves 22, 40, tee fittings 34, 36, conduit sections 16, 17, 19, 20, 74a, 74b, 74c, and supply override valve 84 for the purposes of clear illustration of the invention. Preferably, check valves 22, 40 and/or supply override valve 84 are incorporated into a single or integrated valve body with corresponding passages in the valve body, thereby eliminating one or more of tee fittings 34, 36 and conduit sections 16, 17, 19, 20, 74a, 74b, 74c, without affecting the overall concept or operation of the invention. In addition, as described above, check valve 40 is biased to allow air to flow from the direction of tires 14 to supply tank 12 when the pneumatic pressure in second deflation pneumatic conduit section 74b is at least fixed differential X greater than the target pressure.

Preferably, rather than employing supply valve 18 in combination with separate first check valve 22 and second check valve 40, the use of fixed differential X by deflation circuit 72 is accomplished through the use of a relieving regulator with a built-in hysteresis for the supply valve. Such a construction eliminates check valves 22, 40 and associated tee fittings 34, 36 and conduit sections 17, 19, 74a, 74b, 74c, without affecting the overall concept or operation of the invention. Preferred relieving regulators with a built-in hysteresis include first exemplary relieving regulator 200 and second exemplary relieving regulator 222, which are shown in FIGS. 7 and 8, respectively, and are described above.

Figure 4A:
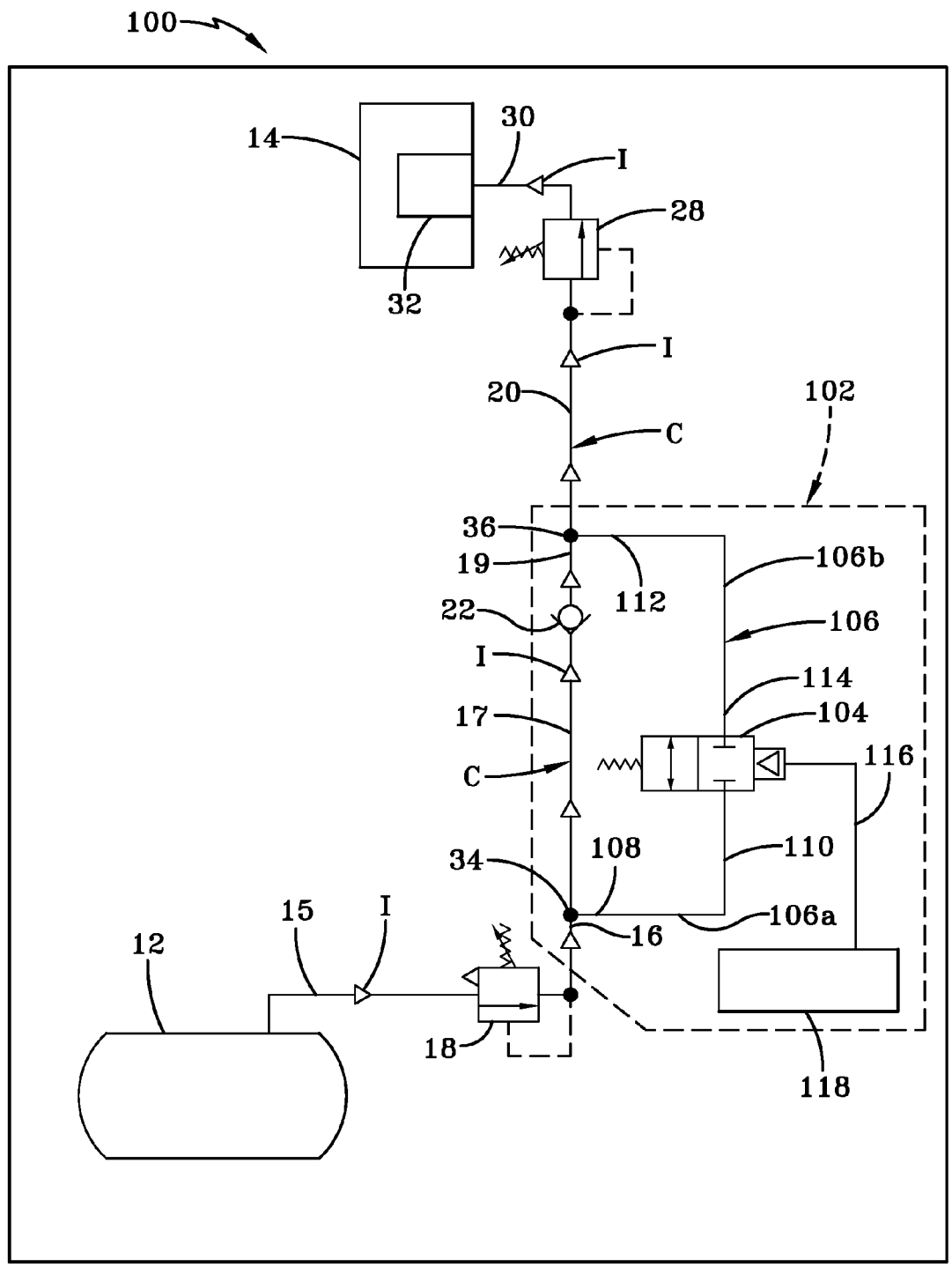
FIG. 4A is a schematic diagram of a fourth exemplary embodiment of the tire inflation system with discrete deflation circuit of the present invention, shown indicating an inflation mode.

With reference now to FIG. 4A, a fourth exemplary embodiment of the tire inflation system with discrete deflation circuit of the present invention is indicated generally at 100. FIG. 4A shows tire inflation system 100 in an inflation mode, and the direction of air flow is generally indicated by arrows I. Fourth embodiment tire inflation system with discrete deflation circuit 100 is generally similar in structure and operation to first, second and third embodiments tire inflation system 10, 50, 70, respectively, with the exception that the fourth embodiment tire inflation system employs a deflation circuit 102 that only allows deflation when the vehicle is parked. As a result, only the differences between fourth embodiment tire inflation system 100 and first embodiment tire inflation system 10 will be described below.

Fourth embodiment tire inflation system 100 retains air pressure in tires 14 during operating conditions by preventing deflation until the vehicle is parked, thereby reducing the likelihood that the vehicle will be operated with tires at a pressure that is too low. More particularly, fourth embodiment tire inflation system 100 employs deflation circuit 102 that includes a deflation pilot valve 104, which only allows deflation of tires 14 to occur when the vehicle is parked.

Deflation circuit 102 is pneumatically connected to and includes a portion of pneumatic conduit C. By way of example, a preferred configuration is similar to deflation circuit 24 of first embodiment tire inflation system 10 (FIG. 1A), in which deflation circuit 102 of fourth embodiment tire inflation system 100 includes first and second tee fittings 34 and 36, which are spaced apart from one another and are fluidly connected to pneumatic conduit C. First tee fitting 34 is fluidly connected to and extends between second pneumatic conduit section 16 and third pneumatic conduit section 17, while second tee fitting is fluidly connected to and extends between fourth pneumatic conduit section 19 and fifth pneumatic conduit section 20. First check valve 22 is disposed between first and second tee fittings 34 and 36, and is fluidly connected to third pneumatic conduit section 17 and fourth pneumatic conduit section 19. First check valve 22 enables air to flow in the direction from supply tank 12 to tires 14, but prevents air from flowing in the opposite direction, that is, from the tires to the supply tank.

Deflation circuit 102 further includes a deflation pneumatic conduit 106, which in turn includes a first deflation conduit section 106a and a second deflation conduit section 106b. First deflation conduit section 106a includes a first end 108 and a second end 110. First end 108 of first deflation conduit section 106a is fluidly connected to first tee fitting 34, which provides fluid communication between second pneumatic conduit section 16 and the first deflation conduit section. Second deflation conduit section 106b includes a first end 112 and a second end 114. First end 112 of second deflation conduit section 106b is fluidly connected to second tee fitting 36, which provides fluid communication between fifth pneumatic conduit section 20 and the second deflation conduit section. Because fourth embodiment tire inflation system 100 does not include optional tire isolation system 130, fifth pneumatic conduit section 20 extends directly to wheel valve 28, eliminating sixth pneumatic conduit section 21 (FIG. 1A), which is employed in first embodiment tire inflation system 10.

Second end 110 of first deflation conduit section 106a is fluidly connected to deflation pilot valve 104, and second end 114 of second deflation conduit section 106b is also fluidly connected to the deflation pilot valve. In this manner, deflation pilot valve 104 is fluidly connected to and extends between first deflation conduit section 106a and second deflation conduit section 106b. It is to be understood that deflation pilot valve 104 is shown in FIG. 4A in an energized state.

Figure 4B:
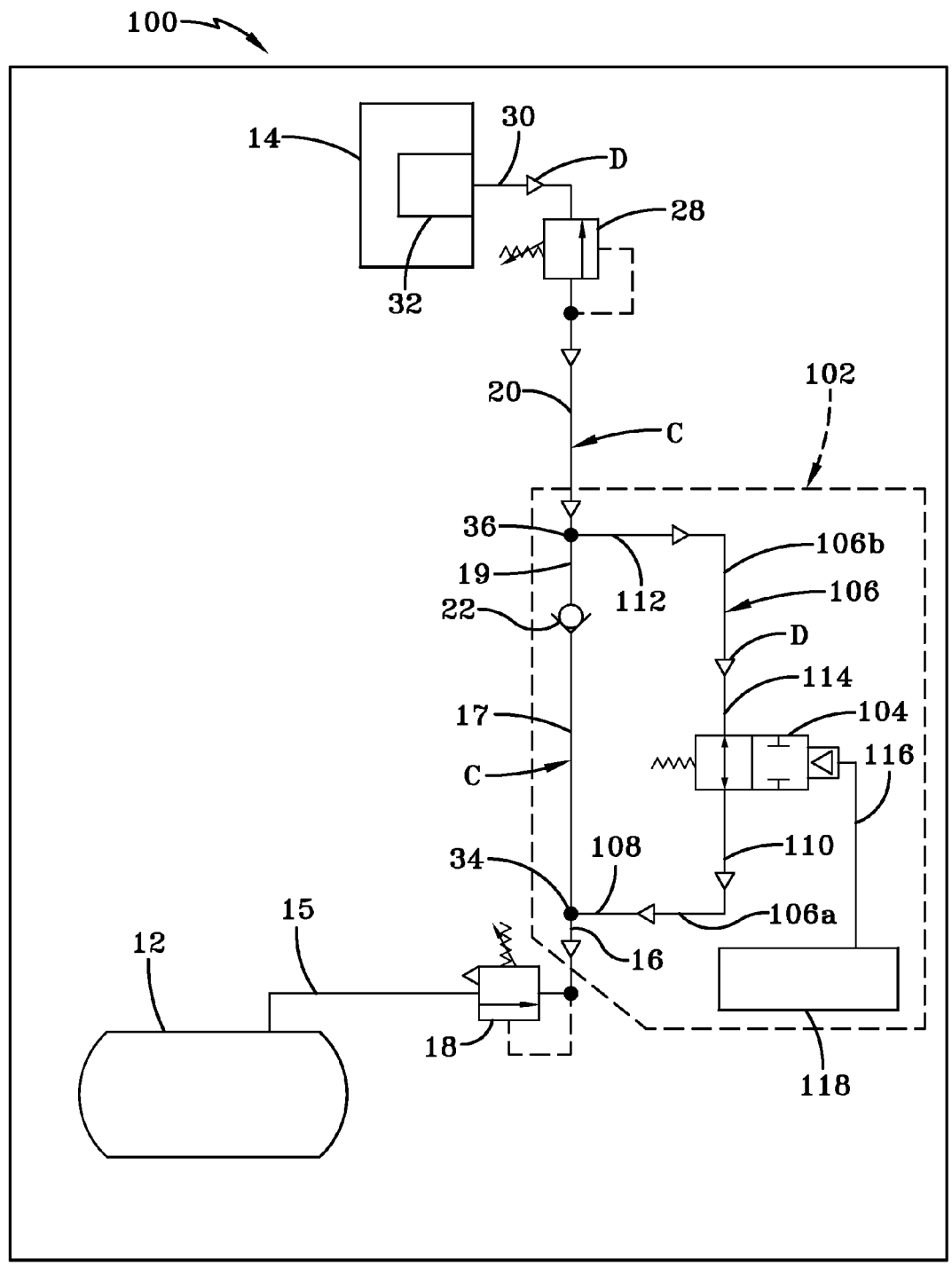
FIG. 4B is a schematic diagram of the embodiment of the tire inflation system shown in FIG. 4A, but shown indicating a deflation mode.

Turning to FIG. 4B, in which fourth embodiment tire inflation system 100 is shown in a deflation mode and the direction of air flow is generally indicated by arrows D, deflation pilot valve 104 enables deflation of tires 14 when the vehicle is parked. More particularly, a parking brake conduit or circuit 116 extends between and is fluidly connected to pilot valve 104 and a parking brake 118 of the vehicle. For trailers of tractor-trailer heavy-duty vehicle applications, parking brake 118 is also referred to in the art as an emergency/supply. The connection of deflation pilot valve 104 to parking brake 118 enables the deflation pilot valve to allow deflation of tires 14 only when the vehicle is parked, thereby preventing deflation of the tires below any minimum recommended guidelines while the vehicle is traveling over-the-road.

For example, deflation pilot valve 104 preferably is a spring-biased pilot valve that is biased to an open position. As shown in FIG. 4B, when the vehicle is parked, there is little or no air pressure on parking brake 118, which enables deflation pilot valve 104 to remain open. When deflation pilot valve 104 is open, air flows through the deflation pilot valve, through first deflation conduit section 106a to second pneumatic conduit section 16 and to supply valve 18. Supply valve 18 then exhausts air until the pressure in second pneumatic conduit section 16 drops to the target pressure, at which point the supply valve closes. In contrast, as shown in FIG. 4A, when the vehicle is traveling over-the-road, air pressure is applied to parking brake 118 to release the parking brake. Based upon the connection of deflation pilot valve 104 to parking brake 118 by parking brake conduit 116, this air pressure overcomes the bias of the deflation pilot valve, moving the valve to a closed position, which in turn prevents deflation of tires 14 during vehicle operation.

The use of deflation pilot valve 104 thus prevents deflation of tires 14 when the vehicle is operating over-the-road, and in turn only allows deflation when the vehicle is parked. Because the minimum recommended tire pressure for a specific vehicle load is set by NHTSA and/or the tire manufacturer based on a cold non-operating pressure, and tires 14 are not able to be deflated until the vehicle is parked, the likelihood of operating the vehicle with the tires below the minimum recommended tire pressure thus is reduced.

In this manner, fourth embodiment tire inflation system 100 provides a constant-pressure system that includes discrete deflation circuit 102. Discrete deflation circuit 102 accommodates an increased tire pressure due to operating conditions by enabling deflation of tires 14 to be controlled, employing monitoring of vehicle parking brake 118 to prevent deflation of the tires while the vehicle is operating, thereby reducing the likelihood that the vehicle will be operated with tires at a pressure that is below a recommended inflation level. In addition, by being a constant-pressure system and using mechanical components that are mechanically and/or pneumatically actuated, rather than components that are electrically actuated and rely on the electrical system of the trailer, fourth embodiment tire inflation system 100 is more reliable, more economical, and is easier to install and use than the electrically-actuated and electrically-controlled systems of the prior art.

It is to be understood that, while deflation circuit 102 has been described with reference to the use of check valve 22, tee fittings 34, 36, deflation pilot valve 104, and conduit sections 16, 106a, 106b, the valves may alternatively be incorporated into a single or integrated valve body with corresponding passages in the valve body, thereby eliminating one or more of the tee fittings and conduit sections, without affecting the overall concept or operation of the invention. In addition, as an alternative to monitoring vehicle parking brake 118 to prevent deflation of tires 14 while the vehicle is operating, fourth embodiment tire inflation system 100 may employ other monitoring means. For example, deflation circuit 102 may be connected to the ignition circuit of a tractor of the vehicle to detect or determine whether the vehicle is prepared for operation. In such a case, if the ignition power of the vehicle is detected, thereby indicating that the vehicle is prepared for operation, deflation of tires 14 would be prevented. Also, deflation circuit 102 may be connected to a sensor that detects motion of a wheel of the vehicle, and if the wheel is moving, deflation of tires 14 is prevented.

Figure 5:
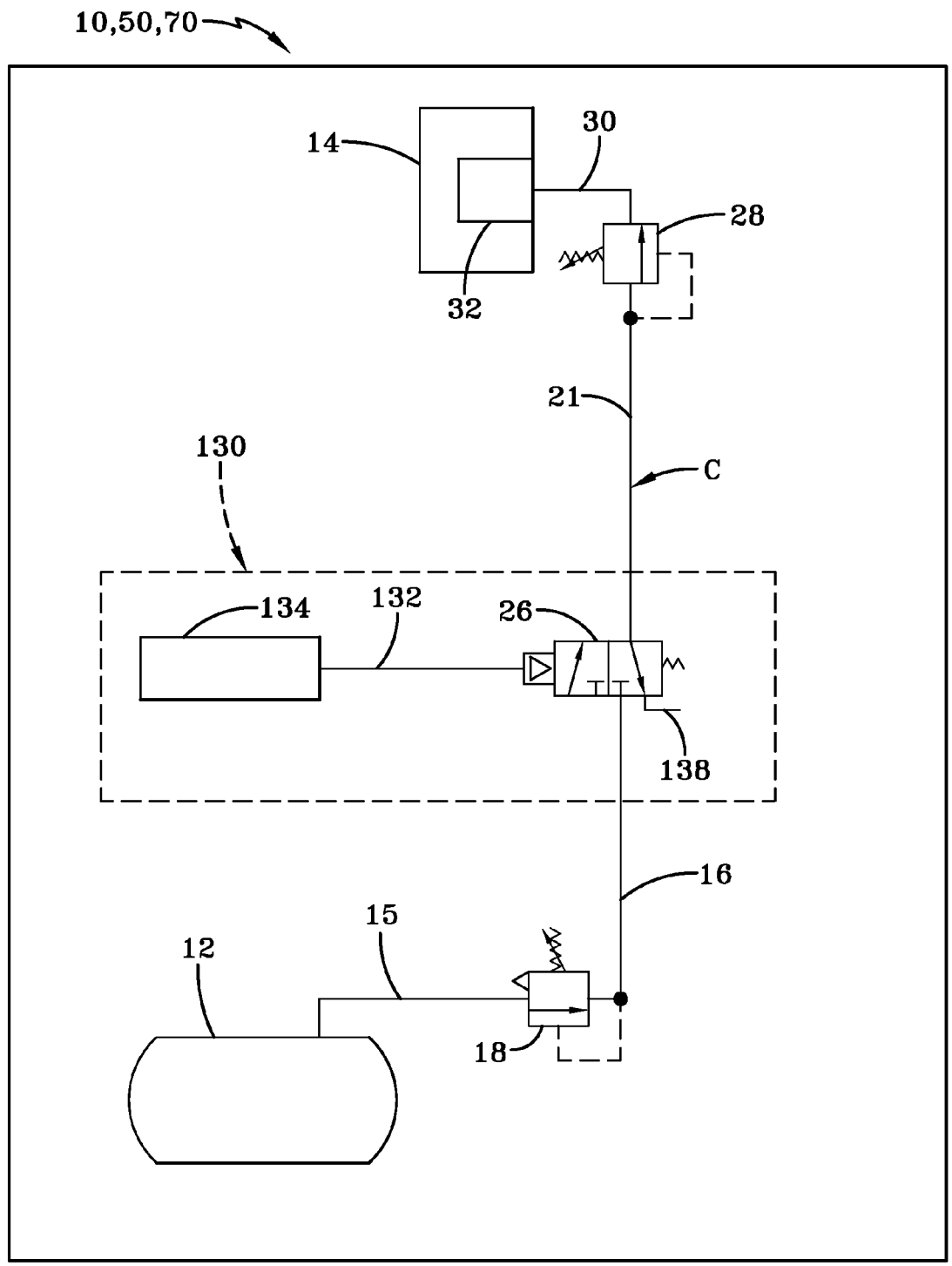
FIG. 5 is a schematic diagram of an optional tire isolation system of the tire inflation system, shown incorporated into a representative tire inflation system with discrete deflation circuit of the present invention.

Turning now to FIG. 5, an optional aspect or feature of the tire inflation system of the present invention, a tire isolation system, is indicated generally at 130. Tire isolation system 130 is particularly useful in first, second and third embodiments tire inflation system 10 (FIGS. 1A and 1B), 50 (FIGS. 2A and 2B) and 70 (FIGS. 3A and 3B), respectively.

More particularly, as described above, when a vehicle has been parked for an extended period of time, the pneumatic pressure in supply tank 12 may drop or bleed down due to small air leaks that are typical in any pneumatic system. In addition, certain prior art pneumatically-controlled, constant-pressure tire inflation systems include a wheel valve that is capable of deflation, which keeps the inflation path from supply tank 12 to tires 14 open. As a result, when the pneumatic pressure in supply tank 12 drops, the pneumatic pressure in tires 14 also drops, which may be a drop of up to about 25 psi. Then, when the vehicle is started up to prepare for over-the-road travel, tires 14 must be re-inflated up to or near the target pressure, which may involve adding about 25 psi to each one of eight or more tires. This re-inflation process typically takes a great deal of time and places repeated demands on tire inflation system 10, 50, 70, which may reduce the life of the system. In addition, if the vehicle operator does not wait for tires 14 to be re-inflated to the target pressure before operating the vehicle, the tires in turn may be operated in an under-inflated condition until the target pressure is reached, which reduces the life of the tires.

To minimize pressure loss and the need to provide significant re-inflation of tires 14, tire isolation system 130 is an optional feature that isolates the tires from supply tank 12 when the vehicle is parked. Tire isolation system 130 includes isolation pilot valve 26. As described above, when supply valve 18 is in an open position, pressurized air flows through the supply valve to second pneumatic conduit section 16. In tire isolation system 130, tee fittings 34, 36 (FIG. 1A), first check valve 22, and third, fourth and fifth pneumatic conduit sections 17, 19 and 20, respectively, are optional components. As a result, isolation pilot valve 26 is shown in FIG. 5 as being fluidly connected to second pneumatic conduit section 16, so that air flows from supply valve 18 through the second pneumatic conduit section to the isolation pilot valve. It is to be understood that isolation pilot valve 26 is shown in FIGS. 1A-1B, 2A-2B, and 3A-3B in an energized state.

While the operation of isolation pilot valve 26 will be described in detail below, when the isolation pilot valve is in an open position, air flows through the isolation pilot valve and proceeds to wheel valve 28 and through sixth pneumatic conduit section 21. Air then flows through wheel valve 28 through seventh pneumatic conduit section 30 to tire valve 32 and into tire 14. Isolation pilot valve 26 thus is disposed between and interconnects second pneumatic conduit section 16 and sixth pneumatic conduit section 21, and its actuation affects air flow between supply tank 12 and tires 14, so that the isolation pilot valve enables isolation of the tires when the vehicle is parked.

More particularly, a parking brake conduit 132 extends between and is fluidly connected to isolation pilot valve 26 and a parking brake 134 of the vehicle. For trailers of tractor-trailer heavy-duty vehicle applications, parking brake 134 is also referred to in the art as an emergency/supply. The connection of isolation pilot valve 26 to parking brake 134 enables the isolation pilot valve to isolate tires 14 when the vehicle is parked.

More specifically, isolation pilot valve 26 preferably is a spring-biased pilot valve, which is biased to a position that obstructs or blocks the flow of air coming from second pneumatic conduit section 16 and exhausts or vents to atmosphere 138 the flow of air coming from sixth pneumatic conduit section 21. As a result, when the vehicle is parked, there is little or no air pressure on parking brake 134, which enables isolation pilot valve 26 to obstruct or block the flow of air coming from second pneumatic conduit section 16 and exhaust to atmosphere 138 the flow of air coming from sixth pneumatic conduit section 21, thereby interrupting fluid communication between supply tank 12 and tires 14. This interruption of fluid communication between supply tank 12 and tires 14 and isolates the tires from the supply tank, which in turn minimizes the pressure loss of the tires when the vehicle is parked. For example, as described above, in the prior art, supply tank 12, and thus tires 14, may experience a pressure drop of up to 25 psi or more when the vehicle is parked for an extended period of time. With the use of tire isolation system 130, including isolation pilot valve 26, such a pressure drop in tires may be reduced to less than 1 psi.

When the vehicle travels over-the-road, air pressure is applied to parking brake 118 to release the parking brake. Based upon the connection of isolation pilot valve 26 to parking brake 134 by parking brake conduit 132, this air pressure overcomes the bias of the isolation pilot valve, moving the valve to an open position. This opening of isolation pilot valve 26 enables air to flow between second pneumatic conduit section 16 and sixth pneumatic conduit section 21 during vehicle operation.

Optionally, isolation pilot valve 26 of tire isolation system 130 also includes detection of the pneumatic pressure in first pneumatic conduit section 15 and thus supply tank 12 to enable the isolation pilot valve to isolate tires 14 if the pneumatic pressure in the supply tank is below a minimum desired pressure level. Such an option provides isolation of tires 14 in the event that the pneumatic pressure in supply tank 12 is below a desired level, in which case isolation of the tires is necessary to minimize the pressure loss in tires 14 due to depletion of supply tank 12 when the vehicle is parked. In addition, isolation pilot valve 26 may optionally be a quick-release valve or may incorporate quick-release features to ensure that, upon isolation of tires 14, sixth pneumatic conduit section 21 is exhausted as quickly as possible, thereby limiting the amount of pneumatic pressure of the tires lost by the exhaustion or venting process.

Moreover, as an alternative to monitoring vehicle parking brake 134 to isolate tires 14, tire isolation system 130 may employ other monitoring means. For example, isolation pilot valve 26 may be connected to the ignition circuit of a tractor of the vehicle to detect or determine whether the vehicle is prepared for operation. In such a case, when the ignition power of the vehicle is not detected, thereby indicating that the vehicle is not prepared for operation, valve 26 would isolate tires 14 as described above. Also, isolation pilot valve 26 may be connected to a sensor that detects motion of a wheel of the vehicle, and if the wheel is not moving, the valve would isolate tires 14.

Tire isolation system 130 thus is an optional feature that is particularly useful in first, second and third embodiments tire inflation system 10, 50 and 70, respectively, to minimize pressure loss when the vehicle is parked, thereby minimizing the need to provide significant re-inflation of tires 14. Minimizing the need to provide significant re-inflation of tires 14 in turn significantly reduces the time required to inflate the tires upon start-up of the vehicle, and also reduces undesirable demands on tire inflation system 10, 50, 70, thereby increasing the life of the system. Tire isolation system 130 also increases the life of tires 14 by reducing the possibility that the tires will be operated before being re-inflated to the target pressure. Moreover, by using mechanical components that are mechanically and/or pneumatically actuated, rather than components that are electrically actuated and rely on the electrical system of the trailer, tire isolation system 130 is reliable, economical, and is easy to install and use.

Figure 6A:
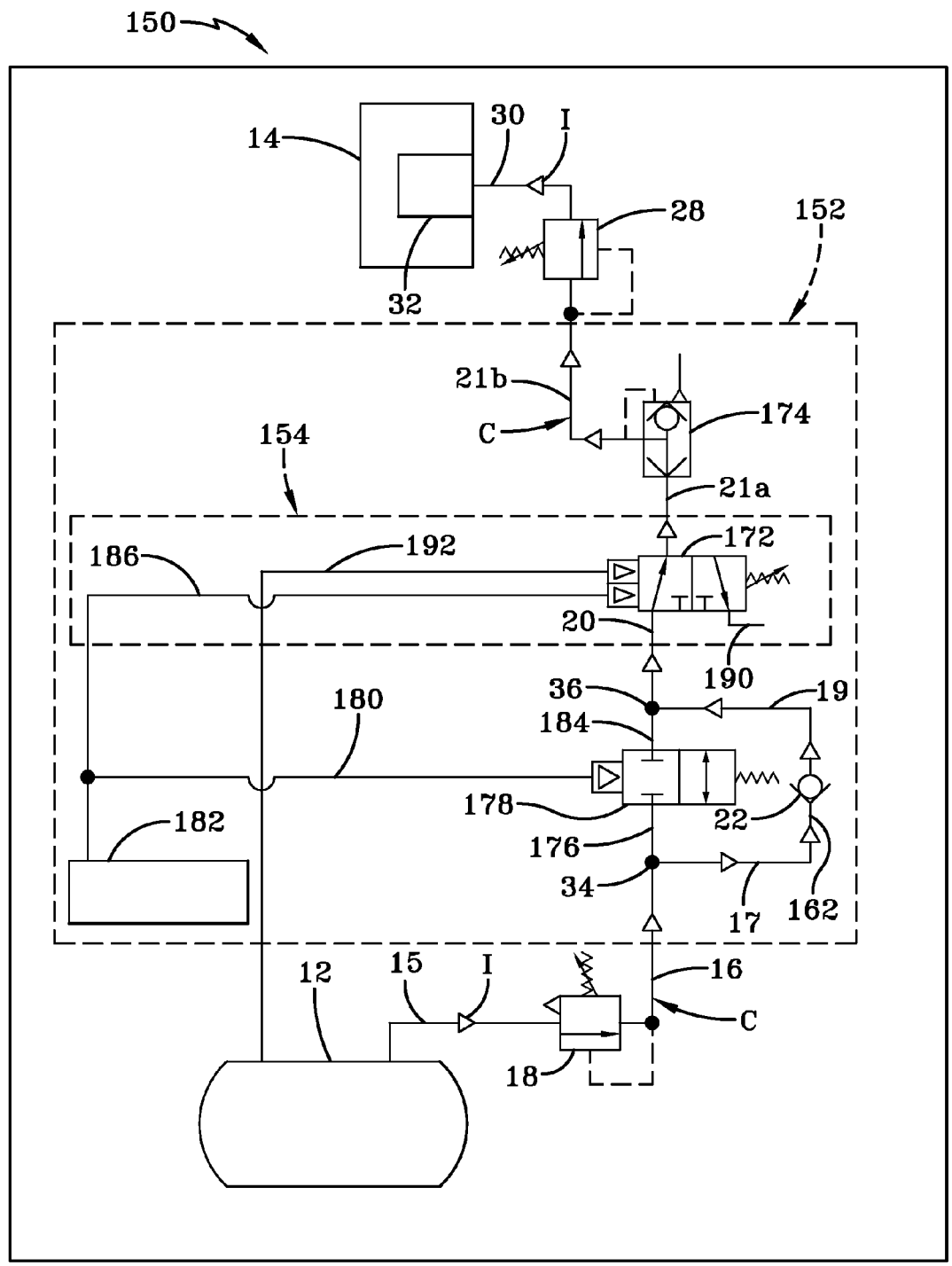
FIG. 6A is a schematic diagram of a fifth exemplary embodiment of the tire inflation system with discrete deflation circuit of the present invention, incorporating a deflation circuit similar to the fourth embodiment tire inflation system shown in FIG. 4A with the optional tire isolation system shown in FIG. 5, and shown indicating an inflation mode.

With reference now to FIG. 6A, a fifth exemplary embodiment of the tire inflation system with discrete deflation circuit of the present invention is indicated generally at 150. FIG. 6A shows tire inflation system 150 in an inflation mode, and the direction of air flow is generally indicated by arrows I. Fifth embodiment tire inflation system with discrete deflation circuit 150 is generally similar in structure and operation to first, second, third, and fourth embodiments tire inflation system 10, 50, 70, 100, respectively, with the exception that the fifth embodiment tire inflation system employs a deflation circuit 152 that only allows deflation when the vehicle is parked, similar to the fourth embodiment tire inflation system shown in FIGS. 4A and 4B, and also incorporates a tire isolation system 154, similar to tire isolation system 130 shown in FIG. 5 and described above. As a result, only the differences between fifth embodiment tire inflation system 150 and fourth embodiment tire inflation system 100, and the differences between tire isolation system 154 of the fifth embodiment tire inflation system and tire isolation system 130, will be described below.

Deflation circuit 152 ensures deflation of tires 14 only when the vehicle is parked and the pneumatic pressure of supply tank 12 exceeds a minimum threshold, and also employs tire isolation system 154 to isolate the tires from the supply tank when the vehicle is parked. More particularly, in fifth embodiment tire inflation system 150, inflation of tires 14 proceeds with air flowing from supply tank 12, through first pneumatic conduit section 15 to supply valve 18, and through the supply valve when the supply valve has been actuated, as described above. When supply valve 18 has been actuated, air flows into second pneumatic conduit section 16.

By way of example, in a preferred configuration, first tee fitting 34 is fluidly connected to and extends between second pneumatic conduit section 16 and to third pneumatic conduit section 17. Third pneumatic conduit section 17 is fluidly connected to and extends between first tee fitting 34 and first check valve 22. First check valve 22 is fluidly connected to and extends between third pneumatic conduit section 17 and fourth pneumatic conduit section 19, and enables air to flow in the direction from supply tank 12 to tires 14, but prevents air from flowing in the opposite direction, that is, from the tires to the supply tank. Fourth pneumatic conduit section 19 is fluidly connected to and extends between first check valve 22 and second tee fitting 36, which in turn is fluidly connected to and extends between the fourth pneumatic conduit section 19 and fifth pneumatic conduit section 20.

During inflation, air thus flows through second pneumatic conduit section 16, third pneumatic conduit section 17, check valve 22, fourth pneumatic conduit section 19, and fifth pneumatic conduit section 20 to isolation pilot valve 172, which is fluidly connected to the fifth pneumatic conduit section.

While the operation of isolation pilot valve 172 will be described in greater detail below, once air flows through the isolation pilot valve, it proceeds through a first portion 21a of sixth pneumatic conduit section 21, which extends between and is fluidly connected to the isolation pilot valve and an optional quick release valve 174. Optional quick release valve 174 provides more rapid actuation of isolation pilot valve 172, as known in the art. The air then flows through a second portion 21b of sixth pneumatic conduit section 21, which extends between and is fluidly connected to optional quick release valve 174 and mechanically-operated wheel valve 28. After flowing through wheel valve 28, air flows to tire valve 32 and into tire 14 through seventh pneumatic conduit section 30.

Deflation circuit 152 includes a first deflation pneumatic conduit 176, which extends between and is fluidly connected to first tee fitting 34 and a deflation pilot valve 178. Deflation circuit 152 also includes a second deflation pneumatic conduit 184, which extends between and is fluidly connected to deflation pilot valve 178 and second tee fitting 36. It is to be understood that isolation pilot valve 172 and deflation pilot valve 178 are shown in FIG. 6A in an energized state.

Figure 6B:
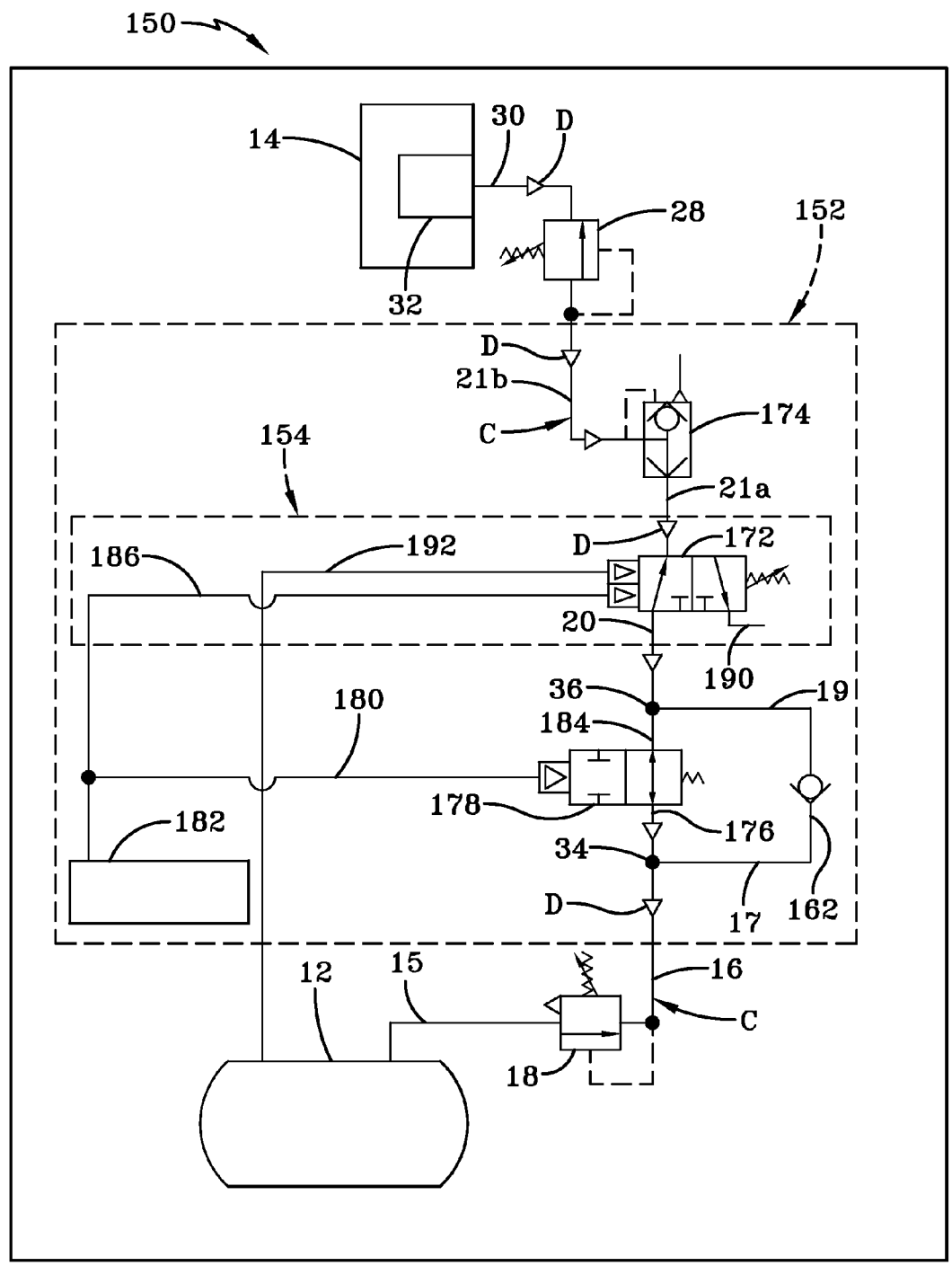
FIG. 6B is a schematic diagram of the embodiment of the tire inflation system shown in FIG. 6A, but shown indicating a deflation mode.

Turning to FIG. 6B, in which fifth embodiment tire inflation system 150 is shown in a deflation mode and the direction of air flow is indicated by arrows D, deflation pilot valve 178 enables deflation of tires 14 when the vehicle is parked. More particularly, a parking brake conduit or circuit 180 extends between and is fluidly connected to deflation pilot valve 178 and a parking brake 182 of the vehicle. For trailers of tractor-trailer heavy-duty vehicle applications, parking brake 182 is also referred to in the art as an emergency/supply. In a manner similar to that as described above for fourth embodiment tire inflation system 100 (FIGS. 4A and 4B), the connection of deflation pilot valve 178 to parking brake 182 enables the deflation pilot valve to allow deflation of tires 14 only when the vehicle is parked, thereby preventing deflation of the tires while the vehicle is traveling over-the-road.

Deflation pilot valve 178 preferable is a spring-biased pilot valve that is biased to an open position. As shown in FIG. 6B, when the vehicle is parked, there is little or no air pressure on parking brake 182, which enables deflation pilot valve 178 to remain open. When deflation pilot valve 178 is open, air flows through the deflation pilot valve, through first deflation conduit 176 to second pneumatic conduit section 16 and to supply valve 18. Supply valve 18 then exhausts air until the pressure in second pneumatic conduit section 16 drops to the target pressure, at which point the supply valve closes. In contrast, as shown in FIG. 6A, when the vehicle is traveling over-the-road, air pressure is applied to parking brake 182 to release the parking brake. Based upon the connection of deflation pilot valve 178 to parking brake 182 by parking brake conduit 180, this air pressure overcomes the bias of the deflation pilot valve, moving the valve to a closed position, which in turn prevents deflation of tires 14 during vehicle operation.

The use of deflation pilot valve 178 thus prevents deflation of tires 14 when the vehicle is traveling, and in turn only allows deflation when the vehicle is parked. Because the minimum recommended tire pressure for a specific vehicle load is set by NHTSA and/or the tire manufacturer based on a cold non-operating pressure, and tires 14 are not able to be deflated until the vehicle is parked, the likelihood of operating the vehicle with the tires below the minimum recommended tire pressure thus is reduced.

As shown in FIGS. 6A and 6B, fifth embodiment tire inflation system 150 also includes tire isolation system 154 to minimize pressure loss in tires 14 due to bleeding down of supply tank 12 when the vehicle is parked for an extended period of time. Minimizing the pressure loss in tires 14 reduces the time required to re-inflate the tires upon actuation of the vehicle, and also desirably minimizes the demands on tire inflation system 150. Minimizing the pressure loss in tires 14 also increases the life of tires 14 by reducing the possibility that the tires will be operated before being re-inflated to the target pressure.

Tire isolation system 154 includes isolation pilot valve 172, which is disposed between and interconnects fifth pneumatic conduit section 20 and first portion 21a of sixth pneumatic conduit section 21. This location of isolation pilot valve 172 affects air flow between supply tank 12 and tires 14, so that the isolation pilot valve enables isolation of the tires when the vehicle is parked. More particularly, a parking brake conduit 186 extends between and is fluidly connected to isolation pilot valve 172 and parking brake 182. It is to be understood that isolation pilot valve 172 is shown in FIGS. 6A and 6B in an energized state.

Isolation pilot valve 172 preferably is a spring-biased pilot valve, which is biased to a position that obstructs or blocks the flow of air coming from fifth pneumatic conduit section 20 and exhausts or vents to atmosphere 190 the flow of air coming from sixth pneumatic conduit section 21. As a result, when the vehicle is parked, there is little or no air pressure on parking brake 182, which enables isolation pilot valve 172 to obstruct or block the flow of air coming from fifth pneumatic conduit section 20 and exhaust to atmosphere 190 the flow of air coming from sixth pneumatic conduit section 21, thereby interrupting fluid communication between supply tank 12 and tires 14. This interruption of fluid communication between supply tank 12 and tires 14 isolates the tires from the supply tank, which in turn minimizes the pressure loss of the tires when the vehicle is parked.

When the vehicle travels over-the-road, air pressure is applied to parking brake 182 to release the parking brake. Based upon the connection of isolation pilot valve 172 to parking brake 182 by parking brake conduit 186, this air pressure overcomes the bias of the isolation pilot valve, moving the valve to an open position. This opening of isolation pilot valve 172 enables air to flow between fifth pneumatic conduit section 20 and sixth pneumatic conduit section 21 during vehicle operation.

Preferably, tire isolation system 154 includes a supply pressure monitoring conduit 192 that extends between and is fluidly connected to isolation pilot valve 172 and supply tank 12. Supply pressure monitoring conduit 192 enables isolation pilot valve 172 to detect the pneumatic pressure in supply tank 12 to in turn enable the isolation pilot valve to isolate tires 14 if the pneumatic pressure in the supply tank is below a minimum desired pressure level. Supply pressure monitoring conduit 192 thus provides isolation of tires 14 in the event that the pneumatic pressure in supply tank 12 is below a desired level, in which case isolation of the tires is necessary to minimize the pressure loss in tires 14 due to depletion of supply tank 12 when the vehicle is parked. In addition, when the pressure in supply tank 12 is above a minimum desired pressure, the air pressure in supply pressure monitoring conduit 192 overcomes the bias of isolation pilot valve 172, moving the valve to an open position. This opening of isolation pilot valve 172 enables air to flow between fifth pneumatic conduit section 20 and sixth pneumatic conduit section 21, thereby enabling air to flow even when the vehicle is parked.

In this manner, fifth embodiment tire inflation system 150 provides a constant-pressure system that includes discrete deflation circuit 152. Discrete deflation circuit 152 accommodates an increased tire pressure due to operating conditions by enabling deflation of tires 14 to be controlled, employing monitoring of vehicle parking brake 182 to prevent deflation of the tires while the vehicle is traveling, thereby reducing the likelihood that the vehicle will be operated with tires at a pressure that is too low. In addition, by being a constant-pressure system and using mechanical components that are mechanically and/or pneumatically actuated, rather than components that are electrically actuated and rely on the electrical system of the trailer, fifth embodiment tire inflation system 150 is more reliable, more economical, and is easier to install and use than the electrically-actuated and electrically-controlled systems of the prior art.

It is to be understood that, while deflation circuit 152 has been described with reference to check valve 22, tee fittings 34, 36, deflation pilot valve 178, and conduit sections 16, 17, 19, 176, 184, the valves may alternatively be incorporated into a single or integrated valve body with corresponding passages in the valve body, thereby eliminating one or more of the tee fittings and conduit sections, without affecting the overall concept or operation of the invention. In addition, as an alternative to monitoring vehicle parking brake 182 to prevent deflation of tires 14 while the vehicle is traveling, fifth embodiment tire inflation system 150 may employ other monitoring means. For example, deflation circuit 152 may be connected to the ignition circuit of a tractor of the vehicle to detect or determine whether the vehicle is prepared for operation. In such a case, if the ignition power of the vehicle is detected, thereby indicating that the vehicle is prepared for operation, deflation of tires 14 would be prevented. Also, deflation circuit 152 may be connected to a sensor that detects motion of a wheel of the vehicle, and if the wheel is moving, deflation of tires 14 is prevented.

Fifth embodiment tire inflation system 150 also includes tire isolation system 154, which minimizes pressure loss when the vehicle is parked, thereby minimizing the need to provide significant re-inflation of tires 14. Minimizing the need to provide significant re-inflation of tires 14 in turn significantly reduces the time required to inflate the tires upon start-up of the vehicle, and reduces undesirable demands on tire inflation system 150, thereby increasing the life of the system. Tire isolation system 154 also increases the life of tires 14 by reducing the possibility that the tires will be operated before being re-inflated to the target pressure.

As an alternative to monitoring vehicle parking brake 182 to prevent deflation of tires 14 while the vehicle is traveling, tire isolation system 154 of fifth embodiment tire inflation system 150 may employ other monitoring means. For example, isolation pilot valve 172 may be connected to the ignition circuit of a tractor of the vehicle to detect or determine whether the vehicle is prepared for operation. In such a case, when the ignition power of the vehicle is not detected, thereby indicating that the vehicle is not prepared for operation, valve 172 would isolate tires 14 as described above. Also, isolation pilot valve 172 may be connected to a sensor that detects motion of a wheel of the vehicle, and if the wheel is not moving, the valve would isolate tires 14.

Figure 9A:
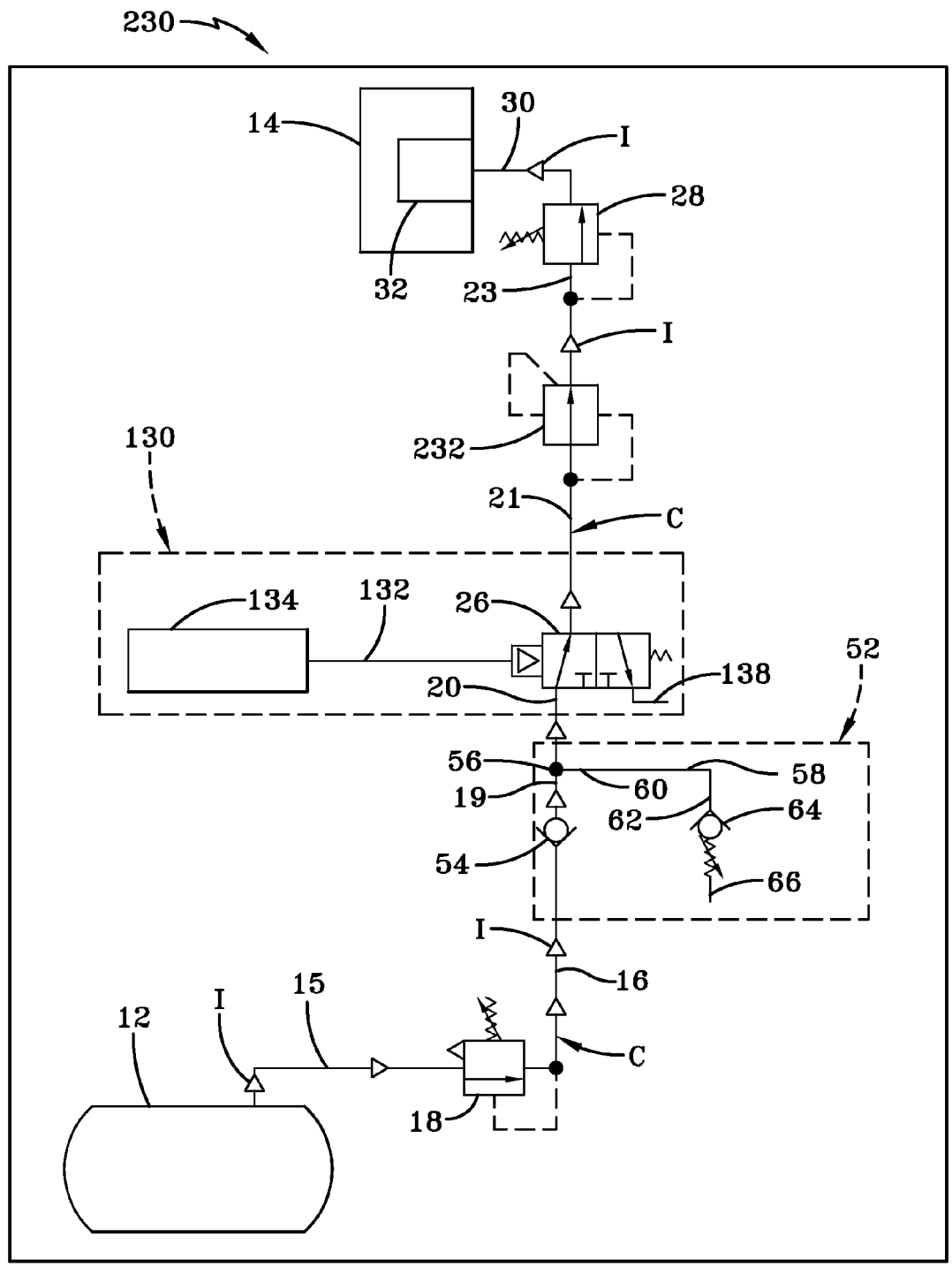
FIG. 9A is a schematic diagram of a sixth exemplary embodiment of the tire inflation system with discrete deflation circuit of the present invention, shown indicating an inflation mode.

With reference now to FIG. 9A, a sixth exemplary embodiment of the tire inflation system with discrete deflation circuit of the present invention is indicated generally at 230. FIG. 9A shows tire inflation system 230 in an inflation mode, and the direction of air flow is generally indicated by arrows I. Sixth embodiment tire inflation system 230 is shown by way of example with a construction that is generally similar in structure and operation to second embodiment tire inflation system 50 (FIGS. 2A-2B), with the exception that the sixth embodiment tire inflation system employs local deflation with central control, as will be described in greater detail below. Only the differences between sixth embodiment tire inflation system 230 and second embodiment tire inflation system 50 will be described below.

Sixth embodiment tire inflation system 230 employs central control and a deflation path that is local to each tire 14, as opposed to second embodiment tire inflation system 50, which employs central control and a deflation path that is common to more than one of the tires. More particularly, sixth embodiment tire inflation system 230 employs deflation circuit 52, which is similar in construction as described above for second embodiment tire inflation system 50, to provide central control over deflation. Sixth embodiment tire inflation system 230 also includes a quick exhaust valve 232 for each respective tire 14, which is fluidly connected to pneumatic conduit C between deflation circuit 52 and wheel valve 28.

Quick exhaust valve 232 may include valves that are referred to in the art as quick exhaust valves, as well as any type of valve known to those skilled in the art which is capable of operating as a quick exhaust valve, such as a pilot-operated regulator or a relay valve. By way of example, quick exhaust valve 232 includes an inlet port (not shown), an outlet port (not shown), and an exhaust port (not shown). The inlet port of quick exhaust valve 232 is fluidly connected to sixth pneumatic conduit section 21, which is the portion of conduit C that is pneumatically upstream of the quick exhaust valve. The outlet port of quick exhaust valve 232 is fluidly connected to a pneumatic conduit section 23 that is between the quick exhaust valve and wheel valve 28, which is the portion of conduit C that is pneumatically downstream of the quick exhaust valve. The exhaust port of quick exhaust valve 232 vents to atmosphere. As is known in the art, the inlet port includes an inlet seat, and the exhaust port includes an exhaust seat. A rubber diaphragm (not shown) is selectively urged between and seats on the inlet seat and the exhaust seat by air flow, as described below.

As shown in FIG. 9A, when inflation of tires 14 is required, supply valve 18 is opened or actuated, enabling air to flow from supply tank 12, through first pneumatic conduit section 15, through the supply valve and to second pneumatic conduit section 16. First check valve 54 ensures that air continues to flow through second pneumatic conduit section 16 to fourth pneumatic conduit section 19, tee fitting 56, fifth pneumatic conduit section 20, optional tire isolation pilot valve 26, and to sixth pneumatic conduit section 21.

Air flows from sixth pneumatic conduit section 21 into the inlet port of quick exhaust valve 232. Air flow from the direction of the inlet port of quick exhaust valve 232 urges the diaphragm against the exhaust seat, thereby causing the diaphragm to seal the exhaust port. When the exhaust port is sealed, air flows from the inlet port of quick exhaust valve 232 to the outlet port and thus to pneumatic conduit section 23 between the quick exhaust valve and wheel valve 28.

Air flow from pneumatic conduit section 23 between regulator 232 and wheel valve 28 continues to the wheel valve, seventh pneumatic conduit section 30, and into tires 14. Once the target pressure is reached, supply valve 18 closes and inflation ceases. Once supply valve 18 is closed, there is no air flow through the inlet port of quick exhaust valve 232, and the pressure differential across the quick exhaust valve keeps the diaphragm seated on the exhaust seat, preventing the quick exhaust valve from venting to atmosphere in such a steady-state condition. Because tire inflation system 230 is a constant-pressure system, pneumatic pressure remains in the sections of pneumatic conduit C that are employed during inflation.

If the pneumatic pressure in tires 14 increases, deflation of the tires may be necessary. In the prior art tire inflation systems that are not capable of deflation, tires 14 may operate in a significantly over-inflated condition, which undesirably decreases their performance and in turn decreases the life of the tires. In tire inflation systems of the prior art that are capable of deflation, the lack of accommodation for an increased tire pressure through pneumatic control may cause the systems to deflate tires 14 down from the optimum operating pressure to the lower cold-tire target pressure, which undesirably decreases tire performance. However, the central control provided by deflation circuit 52 limits deflation of tires 14 below a minimum predetermined pressure, such as a minimum recommended pressure for a specific vehicle load as set by NHTSA and/or the tire manufacturer, which optimizes tire performance.

Figure 9B:
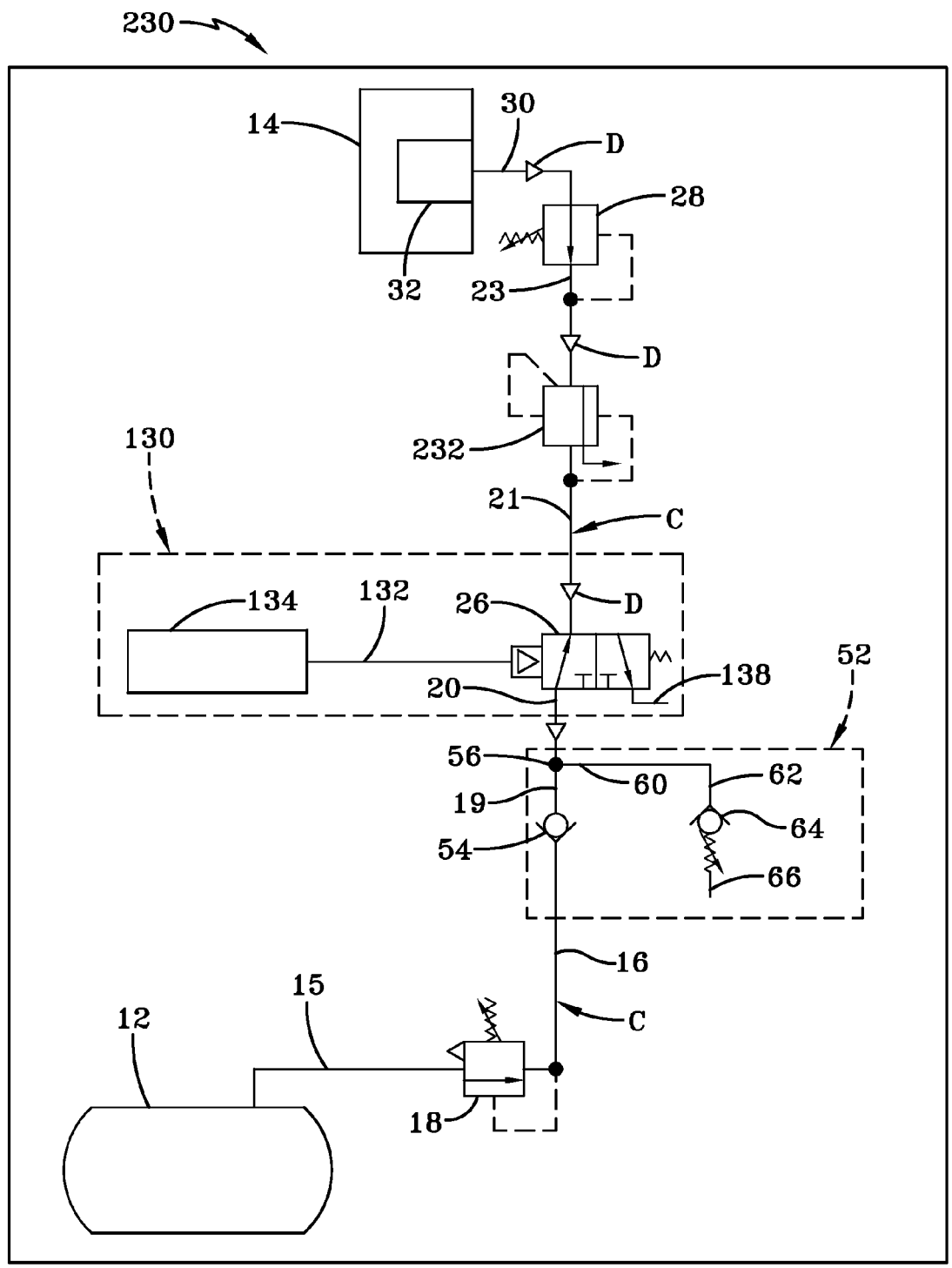
FIG. 9B is a schematic diagram of the embodiment of the tire inflation system shown in FIG. 9A, but shown indicating a deflation mode.

Turning now to FIG. 9B, sixth embodiment tire inflation system 230 is shown in a deflation mode, and the direction of air flow is generally indicated by arrows D. Sixth embodiment tire inflation system 230 includes deflation circuit 52 to provide central control over deflation, and one quick exhaust valve 232 for each respective tire 14 to provide local deflation for each tire. Each quick exhaust valve 232 allows air from its respective tire 14 to exhaust directly to atmosphere when the tire reaches a pressure level that is greater than predetermined pressure level Y. As described above, predetermined level Y is adjustable by a vehicle operator or technician for a specific vehicle load and/or travel conditions through adjustment of second check valve 64 of deflation circuit 52, and thus is a variable deflation pressure. For example, a preferred pressure level Y is the cold-tire target pressure plus 15 psi, so that if the target pressure is 100 psi, Y would be 115 psi.

When the pressure in tire 14 is higher than predetermined pressure level Y, deflation commences. During deflation, air flows through seventh pneumatic conduit section 30, through wheel valve 28, and through pneumatic conduit section 23 between the wheel valve and quick exhaust valve 232. Upon reaching quick exhaust valve 232, air flows into the outlet port of the quick exhaust valve. Air flow from the direction of the outlet port of quick exhaust valve 232 urges the diaphragm against the inlet seat, thereby causing the diaphragm to seal the inlet port. When the inlet port is sealed, air flows from the outlet port of quick exhaust valve 232 to the exhaust port and thus out of the quick exhaust valve to atmosphere.

When the pressure in tire 14 decreases to predetermined pressure level Y, the pneumatic pressure and thus the air flow between the inlet port and outlet port of quick exhaust valve 232 equalizes, which urges the diaphragm over the exhaust seat of the quick exhaust valve. In this manner, the diaphragm seals the exhaust port of quick exhaust valve 232. When the exhaust port is sealed, quick exhaust valve 232 returns to the steady state of air flow from the inlet port of the quick exhaust valve to the outlet port, preventing further exhaustion of air to atmosphere.

As mentioned above, deflation circuit 52 provides central control over deflation. More particularly, a predetermined pressure differential between the outlet port and the inlet port of quick exhaust valve 232 is required in order to urge the diaphragm from the quick exhaust valve exhaust seat to the inlet seat, and thus enable the exhaust of air from tire 14 to atmosphere. If the pressure differential between the outlet port and the inlet port of quick exhaust valve 232 is too low, there is no exhaust of tire 14 through the quick exhaust valve. The pressure at the outlet port of quick exhaust valve 232 is determined by the pressure in tire 14, and the pressure at the inlet port of the quick exhaust valve is determined by the pressure in sixth pneumatic conduit section 21. The pressure in sixth pneumatic conduit section 21 in turn is regulated by deflation circuit 52, including second check valve 64, as described above. It is only when tire 14 reaches the predetermined pressure differential with the pressure in sixth pneumatic conduit section 21 that the diaphragm is urged from the exhaust seat to the inlet seat, and local exhaust through quick exhaust valve 232 is actuated. In this manner, deflation circuit 52 acts as a non-electronic central control over quick exhaust valve 232.

In this manner, sixth embodiment tire inflation system 230 provides a constant-pressure system that includes discrete deflation circuit 52 to provide central control over deflation, and local deflation for each tire through quick exhaust valve 232. Discrete deflation circuit 52 accommodates an increased tire pressure due to operating conditions by enabling deflation of tires 14 to be controlled, employing predetermined variable deflation pressure Y to prevent deflation of the tires below a minimum predetermined pressure, such as a minimum recommended pressure for a specific vehicle load as set by NHTSA and/or the tire manufacturer. In addition, by being a constant-pressure system and using mechanical components that are mechanically and/or pneumatically actuated, rather than components that are electrically actuated and rely on the electrical system of the trailer, sixth embodiment tire inflation system 230 is more reliable, more economical, and is easier to install and use than the electrically-actuated and electrically-controlled systems of the prior art.

It is to be understood that deflation circuit 52 and quick exhaust valve 232 of sixth embodiment tire inflation system 230 has been described with reference to the use of specific valves and conduit sections for the purpose of clear illustration of the invention. Such valves and conduit sections may be adjusted or rearranged without affecting the overall concept or operation of the invention. In addition, sixth embodiment tire inflation system 230 has been described by way of example in conjunction with the structure of second embodiment tire inflation system 50 (FIGS. 2A-2B), with the understanding that the local deflation and central control of the sixth embodiment tire inflation system may also be employed with the structure of first embodiment tire inflation system 10 (FIGS. 1A-1B), third embodiment tire inflation system 70 (FIGS. 3A-3B), fourth embodiment tire inflation system 100 (FIGS. 4A-4B), and fifth embodiment tire inflation system 150 (FIGS. 6A-6B).

It is to be understood that tire inflation system of the present invention 10, 50, 70, 100, 150, 230 fluidly connects supply tank 12 to a plurality of vehicle tires 14, and one tire has been shown herein for the purpose of convenience. Discrete deflation circuit 24, 52, 72, 102, 152, fluidly connects to and communicates with the plurality of vehicle tires 14, thereby enabling control of deflation of multiple tires using a common pneumatic circuit. In this manner, tire inflation system of the present invention 10, 50, 70, 100, 150, 230, with each respective discrete deflation circuit 24, 52, 72, 102, 152 and quick exhaust valve 232, provides an efficient and economical system.

The above-described structure and function of tire inflation system of the present invention 10, 50, 70, 100, 150, 230 thus overcome the disadvantages of prior art tire inflation systems. More particularly, discrete deflation circuit 24, 52, 72, 102, 152 and quick exhaust valve 232 of tire inflation system of the present invention 10, 50, 70, 100, 150, 230, respectively, enables control of deflation of tires 14 based on specific predetermined conditions to accommodate an increased tire pressure based on operating conditions. This control prevents deflation based on a cold-tire target pressure setting when the tires increase to a higher operating pressure, thereby reducing the likelihood that the vehicle may be operated with tires 14 being below a level that is recommended by NHTSA or the tire manufacturer, which in turn optimizes tire performance.

More specifically, deflation circuit 24 of first embodiment tire inflation system 10 employs fixed differential deflation pressure X to prevent deflation of tires 14 below a minimum predetermined pressure, such as a minimum recommended pressure for a specific vehicle load as set by NHTSA and/or the tire manufacturer. Deflation circuit 52 of second embodiment tire inflation system 50 employs variable deflation pressure Y to prevent deflation of tires 14 below a minimum predetermined pressure. Deflation circuit 72 of third embodiment tire inflation system 70 employs fixed differential deflation pressure X to prevent deflation of the tires below a minimum predetermined pressure, and also monitors the supply pressure to prevent exhaustion of air when the pressure in supply tank 12 is below a predetermined level, thereby desirably reducing the demands placed on the supply tank and minimizing the time required to re-inflate tires 14. Deflation circuit 102 of fourth embodiment tire inflation system 100 employs monitoring of the vehicle parking brake to prevent deflation of the tires while the vehicle is traveling over-the-road, which reduces the likelihood that the vehicle will be operated with tires at a pressure that is too low. Deflation circuit 152 of fifth embodiment tire inflation system 150 employs monitoring of the vehicle parking brake to prevent deflation of the tires while the vehicle is operating, and also includes tire isolation system 154. Sixth embodiment tire inflation system 230 employs central control using deflation circuit 52, and a deflation path that is local to each tire 14 using quick exhaust valve 232.

Tire isolation system 154 of fifth embodiment tire inflation system 150, and optional tire isolation system 130 for use with first, second, third, and sixth embodiments tire inflation system 10, 50, 70, 230, respectively, isolates tires 14 from supply tank 12 when the vehicle is parked. This isolation minimizes the pressure loss of tires 14 while the vehicle is parked, which in turn minimizes the amount of time needed to re-inflate the tires when the vehicle is activated, and desirably reduces the demand on each tire inflation system 10, 50, 70, 150, 230 for re-inflation of the tires. Tire isolation system 130, 154 also increases the life of tires 14 by reducing the possibility that the tires will be operated before being re-inflated to the target pressure.

Tire inflation system of the present invention 10, 50, 70, 100, 150, 230 preferably employs mechanical components that are mechanically and/or pneumatically actuated, rather than electronically-operated solenoid valves, electronic controllers, and other electronic components, which are expensive and often complex to install and configure. As a result, tire inflation system 10, 50, 70, 100, 150, 230 is simple, economical and easy to install. In addition, by being a mechanically and pneumatically actuated system, tire inflation system of the present invention 10, 50, 70, 100, 150, 230 is reliable, since it does not require the use of the electrical system of the trailer, which may be unreliable or even non-functional at times.

Moreover, by not exhausting when inflation of tires 14 is complete, tire inflation system of the present invention 10, 50, 70, 100, 150, 230 is a constant-pressure system. Such a constant-pressure system 10, 50, 70, 100, 150, 230 does not require expensive and complex electronic controls to determine when it is necessary to trigger or commence inflation. For this additional reason, tire inflation system 10, 50, 70, 100, 150, 230 is simple, economical and easy to install, and by not employing electrical components, does not require the use of the electrical system of the trailer and thus is reliable. In addition, as a constant-pressure system, tire inflation system of the present invention 10, 50, 70, 100, 150, 230 continuously monitors tire pressure and dynamically responds to pressure changes, thereby actively or quickly responding to reduced tire pressure conditions, such as in the case of an air leak.

An additional feature of tire inflation system of the present invention 10, 50, 70, 100, 150 is the ability to optionally locate deflation circuits 24, 52, 72, 102, 152, respectively, near supply valve 18, which enables the valves of the deflation circuit to be in an enclosure with the supply valve. Such an enclosure protects the valves, and in turn protects any valve ports that may exhaust to atmosphere. Enclosing and thus protecting the valve ports keeps them clean and open, in contrast to prior art tire inflation systems, which often employ exhaust valves that are adjacent tires 14 and thus cannot be enclosed. Such exhaust valves of prior art systems are exposed to the elements and often encounter problems with contamination, which impairs operation of the valves and reduces the efficiency of the system. By optionally enclosing and protecting valves of deflation circuits 24, 52, 72, 102, 152, optimum valve operation is maintained, thereby maintaining the efficiency of tire inflation system of the present invention 10, 50, 70, 100, 150, respectively.

Another feature that may optionally be included in certain embodiments of the invention, such as second embodiment tire inflation system 50, is an option to include mechanical means, such as a spring or threaded drive, on supply valve 18 and/or valve 64 of deflation circuit 52 to adjust the regulator pressure of each valve simultaneously with a check of atmospheric pressure. This adjustment enables second embodiment tire inflation system 50 to make adjustments based on a comparison to atmospheric pressure, which improves the accuracy and efficiency of the system.

The present invention also includes a method of providing a tire inflation system with a deflation circuit that is discrete or separate from the inflation circuit, and a method of deflating a tire using a deflation circuit that is separate from an inflation circuit, both of which desirably enable control of the conditions under which deflation occurs. The present invention also includes a method of providing a tire inflation system with a tire isolation system when the vehicle is parked, and a method of isolating a tire when the vehicle is parked. Each method includes steps in accordance with the description that is presented above and shown in FIGS. 1A-9B.

It is to be understood that the structure of the above-described tire inflation system with discrete deflation circuit of the present invention 10, 50, 70, 100, 150, 230 and tire isolation system 130, 154, may be altered or rearranged, or certain components omitted or added, without affecting the overall concept or operation of the invention. For example, valves in addition to or other than those shown and described may be employed, including solenoid valves, and the location and arrangement of components may be adjusted based on specific design requirements. In addition, components such as optional tire isolation system 130, 154 may be omitted, or may be employed in tire inflation systems having configurations other than those shown herein. It is to be further understood that the present invention finds application in types of tire inflation systems for heavy-duty vehicles, other than those shown and described herein and which are known to those skilled in the art, without affecting the concept or operation of the invention. Moreover, gases other than air that may be compressed and follow the principles of fluid flow, including nitrogen, carbon dioxide, and the like, may be employed without affecting the concept or operation of the invention.

Accordingly, the improved tire inflation system with discrete deflation circuit is simplified, provides an effective, safe, inexpensive, and efficient structure which achieves all the enumerated objectives, provides for eliminating difficulties encountered with prior art tire inflation systems, and solves problems and obtains new results in the art.

In the foregoing description, certain terms have been used for brevity, clarity and understanding; but no unnecessary limitations are to be implied therefrom beyond the requirements of the prior art, because such terms are used for descriptive purposes and are intended to be broadly construed. Moreover, the present invention has been described with reference to exemplary embodiments. It shall be understood that this illustration is by way of example and not by way of limitation, as the scope of the invention is not limited to the exact details shown or described. Potential modifications and alterations will occur to others upon a reading and understanding of this disclosure, and it is understood that the invention includes all such modifications and alterations and equivalents thereof.

Having now described the features, discoveries and principles of the invention, the manner in which the improved tire inflation system with discrete deflation circuit is constructed, arranged and used, the characteristics of the construction and arrangement, and the advantageous, new and useful results obtained; the new and useful structures, devices, elements, arrangements, parts and combinations are set forth in the appended claims.

What is claimed is:

1. A vehicle tire inflation system, comprising:
   an air supply source in fluid communication with a plurality of tires of a vehicle;
   a pneumatic conduit extending between and being in fluid communication with said air supply source and said tires; and
   means fluidly connected to said pneumatic conduit for enabling selective inflation and deflation of said tires, said means including:
   a first pneumatic circuit for inflation of said tires;
   a second pneumatic circuit for common control of deflation of said tires, said second pneumatic circuit being at least partially discrete from said first pneumatic circuit;
   a plurality of quick exhaust valves, each one of said quick exhaust valves being fluidly connected to a respective one of said tires and being responsive to said second pneumatic circuit to provide selective deflation of its respective tire; and
   said means providing controlled deflation of said tires based upon a predetermined condition, whereby said tire inflation system accommodates an increased pressure in said tires.

2. The vehicle tire inflation system of claim 1, wherein at least one of said quick exhaust valves is a pilot-operated regulator or a relay valve that is capable of operating as a quick exhaust valve.

3. The vehicle tire inflation system of claim 1, wherein said system is a constant pressure system.

4. The vehicle tire inflation system of claim 1, wherein said system does not employ electronic components.

5. The vehicle tire inflation system of claim 1, wherein:
   said pneumatic conduit is a first pneumatic conduit;
   said means includes a supply valve, a first check valve, and a second check valve;
   said first pneumatic circuit includes said supply valve and said first check valve being fluidly connected to said first pneumatic conduit;
   said second pneumatic circuit includes a second pneumatic conduit being fluidly connected to said first pneumatic conduit; and
   said second check valve being fluidly connected to said second pneumatic conduit, the second check valve providing said common control of deflation of said tires based upon said predetermined condition.

6. The vehicle tire inflation system of claim 5, wherein said predetermined condition is a pressure in said tires being a fixed differential greater than a target inflation pressure of the tires.

7. The vehicle tire inflation system of claim 6, wherein said fixed differential is a difference between a cold pressure of said tires and an operating pressure of the tires.

8. The vehicle tire inflation system of claim 5, wherein said predetermined condition is a pressure in said tires being a variable deflation pressure greater than a target inflation pressure of the tires.

9. The vehicle tire inflation system of claim 8, wherein said variable deflation pressure is a value of about fifteen pounds per square inch greater than said target inflation pressure.

10. The vehicle tire inflation system of claim 1, wherein said means includes a relieving regulator.

11. The vehicle tire inflation system of claim 1, wherein said second pneumatic circuit for deflation of said tires further comprises a supply override valve in fluid communication with said air supply source, said supply override valve preventing deflation of the tires when a pneumatic pressure in the air supply source is below a minimum level.

12. The vehicle tire inflation system of claim 1, wherein said second pneumatic circuit for deflation of said tires includes a pilot valve in fluid communication with said pneumatic conduit and with a parking brake of said vehicle, said pilot valve providing controlled deflation of said tires upon engagement of said parking brake.

13. The vehicle tire inflation system of claim 1, further comprising a tire isolation pilot valve in fluid communication with said pneumatic conduit and in fluid communication with said air supply source, whereby said tire isolation pilot valve interrupts said fluid communication between said air supply source and said tires when a pneumatic pressure in the air supply source is below a minimum level.

14. The vehicle tire inflation system of claim 1, further comprising a wheel valve in fluid communication with each one of said tires to selectively isolate one of the tires from other components of said tire inflation system.

* * * * *